(12) United States Patent
Kim

(10) Patent No.: US 12,396,011 B2
(45) Date of Patent: Aug. 19, 2025

(54) METHOD AND APPARATUS OF RESOURCE MANAGEMENT FOR MULTICAST AND BROADCAST SERVICE

(71) Applicant: ELECTRONICS AND TELECOMMUNICATIONS RESEARCH INSTITUTE, Daejeon (KR)

(72) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 653 days.

(21) Appl. No.: 17/675,274

(22) Filed: Feb. 18, 2022

(65) Prior Publication Data

US 2022/0272662 A1    Aug. 25, 2022

(30) Foreign Application Priority Data

Feb. 22, 2021 (KR) .................. 10-2021-0023413
Mar. 5, 2021 (KR) .................. 10-2021-0029423
(Continued)

(51) Int. Cl.
*H04W 72/00* (2023.01)
*H04W 4/06* (2009.01)
(Continued)

(52) U.S. Cl.
CPC ............ *H04W 72/30* (2023.01); *H04W 4/06* (2013.01); *H04W 72/044* (2013.01);
(Continued)

(58) Field of Classification Search
CPC ... H04W 72/30; H04W 72/23; H04W 72/044; H04W 72/1263; H04W 76/20; H04W 4/06
See application file for complete search history.

(56) References Cited

U.S. PATENT DOCUMENTS 10,834,749 B2   11/2020   Kim et al.
2020/0280971 A1   9/2020   Moon et al.
(Continued)

FOREIGN PATENT DOCUMENTS

WO   2019/158291 A1   8/2019

OTHER PUBLICATIONS

Huawei, HiSilicon, "Revised Work Item on NR Multicast and Broadcast Services", RP-201038, 3GPP TSG RAN Meeting #88-e, E-meeting, Jun. 29-Jul. 3, 2020.

*Primary Examiner* — Melvin C Marcelo
(74) *Attorney, Agent, or Firm* — Rabin & Berdo, P.C.

(57) ABSTRACT

An operation method of a terminal in a communication system may comprise: receiving, from a base station, first configuration information of a unicast BWP; receiving, from the base station, second configuration information of a multicast and broadcast service (MBS) resource region; receiving control information on an MBS PDCCH within the MBS resource region indicated by the second configuration information; receiving MBS data on an MBS PDSCH within the MBS resource region, the MBS PDSCH being indicated by the control information; and receiving unicast data in the unicast BWP indicated by the first configuration information.

12 Claims, 7 Drawing Sheets

(30) Foreign Application Priority Data

Aug. 4, 2021 (KR) .......................... 10-2021-0102778
Feb. 10, 2022 (KR) .......................... 10-2022-0017570

(51) Int. Cl.
| | |
|---|---|
| *H04W 72/04* | (2023.01) |
| *H04W 72/044* | (2023.01) |
| *H04W 72/12* | (2023.01) |
| *H04W 72/1263* | (2023.01) |
| *H04W 72/23* | (2023.01) |
| *H04W 72/30* | (2023.01) |
| *H04W 76/20* | (2018.01) |

(52) U.S. Cl.
CPC ....... *H04W 72/1263* (2013.01); *H04W 72/23* (2023.01); *H04W 76/20* (2018.02)

(56) References Cited

U.S. PATENT DOCUMENTS

| | | |
|---|---|---|
| 2021/0037500 A1 | 2/2021 | Liu et al. |
| 2021/0044380 A1 | 2/2021 | Ly et al. |
| 2021/0045017 A1 | 2/2021 | Takeda et al. |
| 2021/0050969 A1 | 2/2021 | Chou et al. |
| 2022/0231818 A1* | 7/2022 | Lee ....................... H04L 5/0098 |

* cited by examiner

METHOD AND APPARATUS OF RESOURCE MANAGEMENT FOR MULTICAST AND BROADCAST SERVICE

CROSS-REFERENCE TO RELATED APPLICATIONS

This application claims priority to Korean Patent Applications No. 10-2021-0023413 filed on Feb. 22, 2021, No. 10-2021-0029423 filed on Mar. 5, 2021, No. 10-2021-0102778 filed on Aug. 4, 2021, and No. 10-2022-0017570 filed on Feb. 10, 2022 with the Korean Intellectual Property Office (KIPO), the entire contents of which are hereby incorporated by reference.

BACKGROUND

1. Technical Field

The present disclosure relates to a radio resource management technique, and more specifically, to a radio resource management technique for providing a multicast and/or broadcast service in a high frequency band.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, a millimeter frequency band (e.g., a frequency band of 6 to 90 GHz) may be used to process rapidly increasing data. A small base station may be used to overcome deterioration of received signal performance due to path attenuation and reflection of radio waves in a high frequency band (e.g., millimeter frequency band). In a communication system supporting the millimeter frequency band, instead of a small base station supporting all functions of a radio protocol, a plurality of remote radio transmission/reception blocks (e.g., remote radio heads (RRHs)) and a centralized baseband processing function block may be deployed.

That is, all functions of a radio protocol can be distributedly supported in the remote radio transmission/reception blocks and the baseband processing function block in a functional split scheme. When the functional split technique is used, resource management methods for providing a multicast and/or broadcast service in consideration of connection states of a plurality of terminals may be required.

SUMMARY

Accordingly, exemplary embodiments of the present disclosure are directed to providing a method and an apparatus of resource management for providing a multicast and/or broadcast service in a communication system.

According to a first exemplary embodiment of the present disclosure, an operation method of a terminal in a communication system may comprise: receiving, from a base station, first configuration information of a unicast bandwidth part (BWP); receiving, from the base station, second configuration information of a multicast and broadcast service (MBS) resource region; receiving control information on an MBS physical downlink control channel (PDCCH) within the MBS resource region indicated by the second configuration information; receiving MBS data on an MBS physical downlink shared channel (PDSCH) within the MBS resource region, the MBS PDSCH being indicated by the control information; and receiving unicast data in the unicast BWP indicated by the first configuration information.

The MBS resource region may be an MBS BWP, a position in which the MBS BWP is configured varies depending on an operation state of the terminal, and the operation state may be a radio resource control (RRC) connected state, RRC inactive state, or RRC idle state.

When the operation state is the RRC connected state and the unicast BWP is activated, the MBS BWP may be configured within the unicast BWP.

When the operation state is the RRC inactive state or the RRC idle state, the MBS BWP may be configured within an initial BWP or a default BWP.

The MBS resource region may be configured in common for an MBS terminal group to which the terminal belongs.

The MBS resource region may be an MBS BWP, and a frequency resource of the MBS BWP may be configured to be associated with a frequency resource of the unicast BWP.

The MBS PDCCH may be configured in an MBS control resource set (CORESET) within the MBS resource region, and a scheduling identifier for the control information may be configured to be associated with a position of the MBS CORESET.

Control information received within the unicast BWP may include a transmission configuration indicator (TCI) state ID of each of the MBS PDCCH and the MBS PDSCH.

A reception interval between the unicast data and the MBS data may be greater than or equal to a BWP switching time, and the BWP switching time may be set by the base station.

The second configuration information may include frequency domain resource allocation information of the MBS resource region, and the frequency domain resource allocation information may include at least one of information on a start point, information on a reference point, information on an offset, information on a number of physical resource blocks (PRBs), or a combination thereof.

The start point may be a frequency resource from which the MBS resource region starts in a frequency domain, and the start point may be indicated by the reference point and the offset.

The reference point may be a point A, a start PRB of the unicast BWP, a start BWP of the default BWP, a start BWP of the initial BWP, a start PRB of an MBS CORESET within the MBS resource region, or an end PRB of the MBS CORESET.

The second configuration information may include time domain resource allocation information of the MBS resource region, and the time domain resource allocation information may include at least one of information of a periodicity, information on a start point, information on an end point, information on an offset, information on a length, or a combination thereof.

According to a second exemplary embodiment of the present disclosure, an operation method of a terminal in a communication system may comprise: performing multicast and broadcast service (IVIES) communications with a source cell; transmitting a handover request message to the source cell; receiving, from the source cell, a handover command message including MBS configuration information of a target cell in response to the handover request message; and performing an access procedure with the target cell based on the MBS configuration information.

The handover command message may further include MBS provision scheme information, and the MBS provision scheme information may include first information indicating a change of an MBS provision scheme or second information indicating an MBS provision scheme to be used in MBS communications with the target cell.

The MBS provision scheme may be a point-to-point (PTP) scheme or a point-to-multipoint (PTM) scheme, and the first information may indicate a change from the PTP scheme to the PTM scheme or a change from the PTM scheme to the PTP scheme.

The access procedure may be a random access procedure, a physical layer synchronization acquisition procedure, or a procedure for configuring a transmission configuration indicator (TCI) state ID for beam pairing.

The performing of the MBS communications may comprise receiving, from the source cell, MBS provision indication information of the target cell, wherein the MBS provision indication information may indicate that the target cell supports MBS or that the target cell does not support MBS.

The operation method may further comprise transmitting, to the source cell, preferred scheme information or switching request information, wherein the preferred scheme information may be information indicating that switching from a point-to-multipoint (PTM) scheme to a point-to-point (PTP) scheme is preferred, or information indicating that switching from the PTP scheme to the PTM scheme is preferred, and the switching request information may be information for requesting switching from the PTM scheme to the PTP scheme or information for request switching from the PTP scheme to the PTM scheme.

When the MBS communications are performed based on a point-to-point (PTP) scheme, first downlink control information (DCI) for the terminal may be scrambled by a first scheduling identifier uniquely assigned to the terminal; and when the MBS communications are performed based on a point-to-multipoint (PTM) scheme, second DCI for the terminal may be scrambled by a second scheduling identifier allocated for an MBS terminal group to which the terminal belongs.

According to the present disclosure, MBS radio resources (e.g., MBS BWP) for multicast and broadcast service (MBS) communications may be configured, and the terminal may perform MBS communications with the base station in the MBS radio resources. In addition, in order to provide continuity of the MBS communications, a handover operation and/or a dual connectivity operation may be supported. That is, the terminal may perform the handover operation or dual connectivity operation, and accordingly may perform MBS communications with a target base station or a plurality of base stations. Therefore, the performance of the communication system can be improved.

DETAILED DESCRIPTION OF THE EMBODIMENTS

Figure 1:
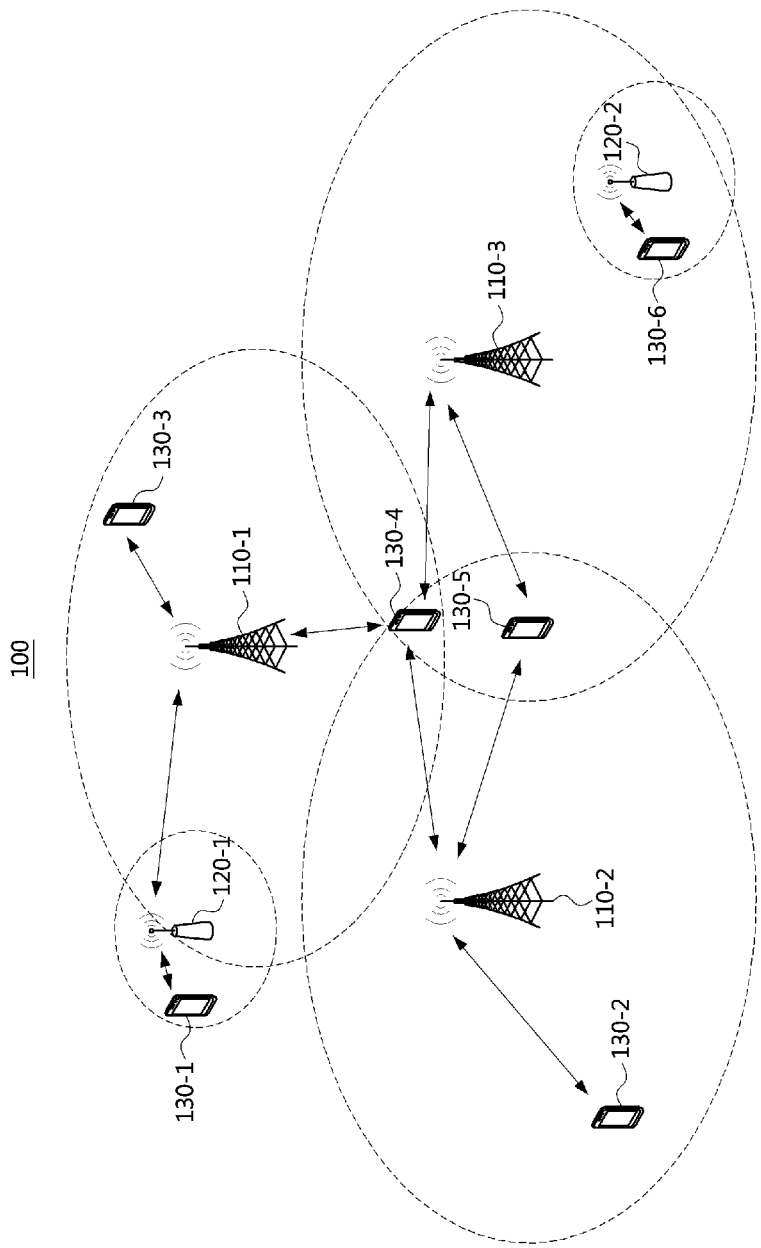
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may mean "transmission", "retransmission", or "transmission and retransmission", "(re)configuration" may mean "configuration", "reconfiguration", or "configuration and reconfiguration", "(re)connection" may mean "connection", "reconnection", or "connection and reconnection", and "(re)access" may mean "access", "re-access", or "access and re-access".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication networks. Here, the communication system may be used in the same sense as a communication network.

In exemplary embodiments, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)).

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Also, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
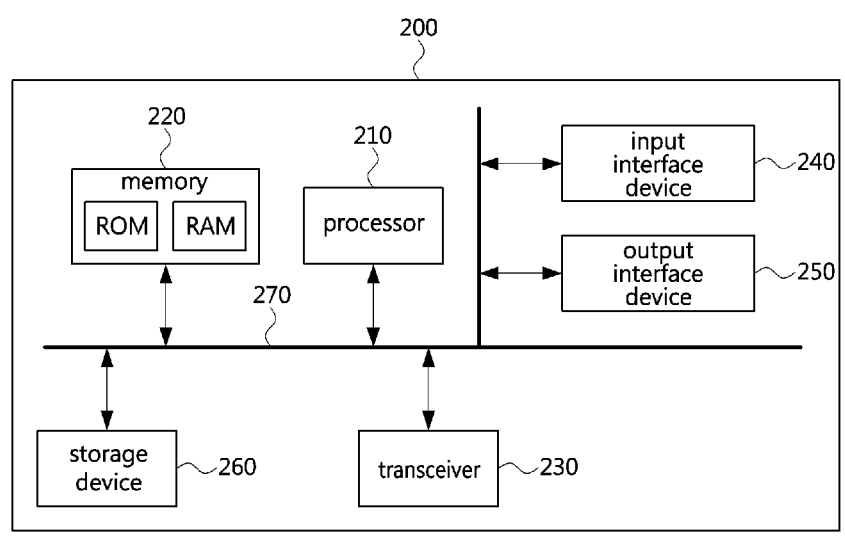
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the following exemplary embodiments, a signaling message may be a signaling message including system information, an RRC signaling message, a MAC signaling message (e.g., MAC control element (CE)), and/or a PHY signaling message (e.g., downlink control information (DCI), uplink control information (UCI), sidelink control information (SCI)). The signaling message may be referred to as a 'control message'. In this case, the control message may be a control message including system information, an RRC control message, a MAC control message, and/or a PHY control message.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a functional-split technique of the communication protocol is applied, the TRP may selectively perform some functions of the BBU or some functions of a medium access control (MAC) layer or a radio link control (RLC) layer.

Figure 3:
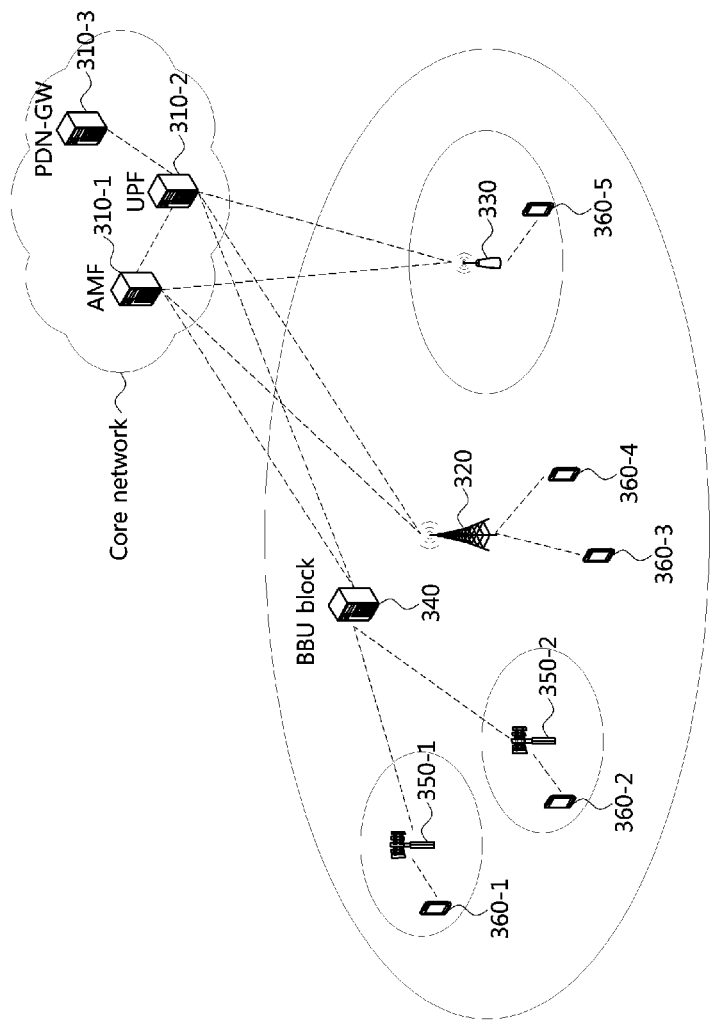
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a core network and an access network. The core network supporting the 4G communication may include an MME, an S-GW, a P-GW, and the like. The core network supporting the 5G communication may include an AMF 310-1, an UPF 310-2, a PDN-GW 310-3, and the like. The access network may include a macro base station 320, a small base station 330, TRPs 350-1 and 350-2, terminals 360-1, 360-2, 360-3, 360-4, and 360-5, and the like. The macro base station 320 or the small base station 330 may be connected to a termination node of the core network via a wired backhaul. The TRPs 350-1 and 350-2 may support the remote radio transmission and reception function among all the functions of the communication protocol, and the baseband processing function for the TRPs 350-1 and 350-2 may be performed by the BBU block 340. The BBU block 340 may belong to the access network or the core network. The communication nodes (e.g., MME, S-GW, P-GW, AMF, UPF, PDN-GW, macro base station, small base station, TRPs, terminals, and BBU block) belonging to the communication system may be configured identically or similarly to the communication node 200 shown in FIG. 2.

The macro base station 320 may be connected to the core network (e.g., AMF 310-1, UPF 310-2, MME, S-GW) using a wired backhaul link or a wireless backhaul link, and may provide communication services to the terminals 360-3 and 360-4 based on a communication protocol (e.g., 4G communication protocol, 5G communication protocol). The small base station 330 may be connected to the core network (e.g., AMF 310-1, UPF 310-2, MME, S-GW) using a wired backhaul link or a wireless backhaul link, and may provide communication services to the terminal 360-5 based on a communication protocol (e.g., 4G communication protocol, 5G communication protocol).

The BBU block 340 may be located in the AMF 310-1, the UPF 310-2, the MME, the S-GW, or the macro base station 320. Alternatively, the BBU block 340 may be located independently of each the AMF 310-1, the UPF 310-2, the MME, the S-GW, and the macro base station 320. For example, the BBU block 340 may be configured as a logical function block between the macro base station 320 and the AMF 310-1 (or UPF 310-2). The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol (e.g., 4G communication protocol, 5G communication protocol).

The communication system including the access network, the Xhaul network, and the core network may be referred to as an 'integrated communication system'. The communication nodes (e.g., MME, S-GW, P-GW, AMF, UPF, BBU block, distributed unit (DU), central unit (CU), base station, TRP, terminal, and the like) belonging to the integrated communication system may be configured identically or similarly to the communication node 200 shown in FIG. 2. The communication nodes belonging to the Xhaul network may be connected using Xhaul links, and the Xhaul link may be a backhaul link or a fronthaul link.

Also, the UPF (or, S-GW) of the integrated communication system may refer to a termination communication node of the core network that exchanges packets (e.g., control information, data) with the base station, and the AMF (or, MME) of the integrated communication system may refer to a communication node in the core network, which performs control functions in a radio access section (or, interface) of the terminal. Here, each of the backhaul link, fronthaul link, Xhaul link, DU, CU, BBU block, S-GW, MME, AMF, and UPF may be referred to as a different term according to a function (e.g., function of the Xhaul network, function of the core network) of a communication protocol depending on a radio access technology (RAT).

In order to perform a mobility support function and a radio resource management function, the base station may transmit a synchronization signal (e.g., a synchronization signal/physical broadcast channel (SS/PBCH) block) and/or a reference signal. In order to support multiple numerologies, frame formats supporting symbols having different lengths may be configured. In this case, the terminal may perform a monitoring operation on the synchronization signal and/or reference signal in a frame according to an initial numerology, a default numerology, or a default symbol length. Each of the initial numerology and the default numerology may be applied to a frame format applied to radio resources in which a UE-common search space is configured, a frame format applied to radio resources in which a control resource set (CORESET) #0 of the NR communication system is configured, and/or a frame format applied to radio resources in which a synchronization symbol burst capable of identifying a cell in the NR communication system is transmitted.

The frame format may refer to information of configuration parameters (e.g., values of the configuration parameters, offset, index, identifier, range, periodicity, interval, duration, etc.) for a subcarrier spacing, control channel (e.g., CORESET), symbol, slot, and/or reference signal. The base station may inform the frame format to the terminal using system information and/or a control message (e.g., dedicated control message).

The terminal connected to the base station may transmit a reference signal (e.g., uplink dedicated reference signal) to the base station using resources configured by the corresponding base station. For example, the uplink dedicated reference signal may include a sounding reference signal (SRS). In addition, the terminal connected to the base station may receive a reference signal (e.g., downlink dedicated reference signal) from the base station in resources configured by the corresponding base station. The downlink dedicated reference signal may be a channel state information-reference signal (CSI-RS), a phase tracking-reference signal (PT-RS), a demodulation-reference signal (DM-RS), or the like. Each of the base station and the terminal may perform a beam management operation through monitoring on a configured beam or an active beam based on the reference signal.

For example, the first base station 611 may transmit a synchronization signal and/or a reference signal so that the first terminal 621 located within its service area can search for itself to perform downlink synchronization maintenance, beam configuration, or link monitoring operations. The first terminal 621 connected to the first base station 611 (e.g., serving base station) may receive physical layer radio resource configuration information for connection configuration and radio resource management from the first base station 611. The physical layer radio resource configuration information may mean configuration parameters included in RRC control messages of the LTE communication system or the NR communication system. For example, the resource configuration information may include PhysicalConfigDedicated, PhysicalCellGroupConfig, PDCCH-Config(Common), PDSCH-Config(Common), PDCCH-ConfigSIB1, ConfigCommon, PUCCH-Config(Common), PUSCH-Config(Common), BWP-DownlinkCommon, BWP-UplinkCommon, ControlResourceSet, RACH-ConfigCommon, RACH-ConfigDedicated, RadioResourceConfigCommon, RadioResourceConfigDedicated, ServingCellConfig, ServingCellConfigCommon, and the like.

The radio resource configuration information may include parameter values such as a configuration (or allocation) periodicity of a signal (or radio resource) according to a frame format of the base station (or transmission frequency), time resource allocation information for transmission, frequency resource allocation information for transmission, a transmission (or allocation) time, or the like. In order to support multiple numerologies, the frame format of the base station (or transmission frequency) may mean a frame format having different symbol lengths according to a plurality of subcarrier spacings within one radio frame. For example, the number of symbols constituting each of a mini-slot, slot, and subframe that exist within one radio frame (e.g., a frame of 10 ms) may be configured differently.

- Configuration information of transmission a frequency and a frame format of a base station
  - Transmission frequency configuration information: information on all transmission carriers (i.e., cell-specific transmission frequency) in the base station, information on bandwidth parts (BWPs) in the base station, information on a transmission reference time or time difference between transmission frequencies of the base station (e.g., a transmission periodicity or offset parameter indicating the transmission reference time (or time difference) of the synchronization signal), etc.
  - Frame format configuration information: configuration parameters of a mini-slot, slot, and subframe having a different symbol length according to a subcarrier spacing
- Configuration information of a downlink reference signal (e.g., channel state information-reference signal (CSI-RS), common reference signal (Common-RS), etc.)
  - Configuration parameters such as a transmission periodicity, transmission position, code sequence, or masking (or scrambling) sequence for a reference signal, which are commonly applied within the coverage of the base station (or beam).
- Configuration information of an uplink control signal
  - Configuration parameters such as a sounding reference signal (SRS), uplink beam sweeping (or beam monitoring) reference signal, uplink grant-free radio resources (or, preambles), etc.
- Configuration information of a physical downlink control channel (e.g., PDCCH)
  - Configuration parameters such as a reference signal for PDCCH demodulation, beam common reference signal (e.g., reference signal that can be received by all terminals within a beam coverage), beam sweeping (or beam monitoring) reference signal, reference signal for channel estimation, etc.
- Configuration information of a physical uplink control channel (e.g., PUCCH)
- Scheduling request signal configuration information
- Configuration information for a feedback (acknowledgement (ACK) or negative ACK (NACK)) transmission resource in a hybrid automatic repeat request (HARQ) procedure
- Number of antenna ports, antenna array information, beam configuration or beam index mapping information for application of beamforming techniques
- Configuration information of a downlink signal and/or an uplink signal (or uplink access channel resource) for beam sweeping (or beam monitoring)
- Configuration information of parameters for beam configuration, beam recovery, beam reconfiguration, or radio link re-establishment operation, beam change operation within the same base station, reception signal of a beam triggering handover execution to another base station, timers controlling the above-described operations, etc.

In case of a radio frame format that supports a plurality of symbol lengths for supporting multi-numerology, the configuration (or allocation) periodicity of the parameter, the time resource allocation information, the frequency resource allocation information, the transmission time, and/or the allocation time, which constitute the above-described information, may be information configured for each corresponding symbol length (or subcarrier spacing).

In the following exemplary embodiments, 'Resource-Config information' may be a control message including one or more parameters of the physical layer radio resource configuration information. In addition, the 'Resource-Config information' may mean attributes and/or configuration values (or range) of information elements (or parameters) delivered by the control message. The information elements (or parameters) delivered by the control message may be radio resource configuration information applied commonly to the entire coverage of the base station (or, beam) or radio resource configuration information allocated dedicatedly to a specific terminal (or, specific terminal group). A terminal group may include one or more terminals.

The configuration information included in the 'Resource-Config information' may be transmitted through one control message or different control messages according to the attributes of the configuration information. The beam index information may not express the index of the transmission beam and the index of the reception beam explicitly. For example, the beam index information may be expressed using a reference signal mapped or associated with the corresponding beam index or an index (or identifier) of a transmission configuration indicator (TCI) state for beam management.

Therefore, the terminal operating in the RRC connected state may receive a communication service through a beam (e.g., beam pair) configured between the terminal and the base station. For example, when a communication service is provided using beam configuration (e.g., beam pairing) between the base station and the terminal, the terminal may perform a search operation or a monitoring operation of a radio channel by using a synchronization signal (e.g., SS/PBCH block) and/or a reference signal (e.g., CSI-RS) of a beam configured with the base station, or a beam that can be received. Here, the expression that a communication service is provided through a beam may mean that a packet is transmitted and received through an active beam among one or more configured beams. In the NR communication system, the expression that a beam is activated may mean that a configured TCI state is activated.

The terminal may operate in the RRC idle state or the RRC inactive state. In this case, the terminal may perform a search operation (e.g., monitoring operation) of a downlink channel by using parameter(s) obtained from system information or common Resource-Config information. In addition, the terminal operating in the RRC idle state or the RRC inactive state may attempt to access by using an uplink channel (e.g., a random access channel or a physical layer uplink control channel). Alternatively, the terminal may transmit control information by using an uplink channel.

The terminal may recognize or detect a radio link problem by performing a radio link monitoring (RLM) operation. Here, the expression that a radio link problem is detected may mean that physical layer synchronization configuration or maintenance for a radio link has a problem. For example, the expression that a radio link problem is detected may mean that it is detected that the physical layer synchronization between the base station and the terminal is not maintained during a preconfigured time. When a radio link problem is detected, the terminal may perform a recovery operation of the radio link. When the radio link is not recovered, the terminal may declare a radio link failure (RLF) and perform a re-establishment procedure of the radio link.

The procedure for detecting a physical layer problem of a radio link, procedure for recovering a radio link, procedure for detecting (or declaring) a radio link failure, and procedure for re-establishing a radio link according to the RLM operation may be performed by functions of a layer 1 (e.g., physical layer), a layer 2 (e.g., MAC layer, RLC layer, PDCP layer, etc.), and/or a layer 3 (e.g., RRC layer) of the radio protocol.

The physical layer of the terminal may monitor a radio link by receiving a downlink synchronization signal (e.g., primary synchronization signal (PSS), secondary synchronization signal (SSS), SS/PBCH block) and/or a reference signal. In this case, the reference signal may be a base station common reference signal, beam common reference signal, or terminal (or terminal group) specific reference signal (e.g., dedicated reference signal allocated to a terminal (or terminal group)). Here, the common reference signal may be used for channel estimation operations of all terminals located within the corresponding base station or beam coverage (or service area). The dedicated reference signal may be used for a channel estimation operation of a specific terminal or a specific terminal group located within the base station or beam coverage.

Accordingly, when the base station or the beam (e.g., configured beam between the base station and the terminal) is changed, the dedicated reference signal for beam management may be changed. The beam may be changed based on the configuration parameter(s) between the base station and the terminal. A procedure for changing the configured beam may be required. The expression that a beam is changed in the NR communication system may mean that an index (or identifier) of a TCI state is changed to an index of another TCI state, that a TCI state is newly configured, or that a TCI state is changed to an active state. The base station may transmit system information including configuration information of the common reference signal to the terminal.

The terminal may obtain the common reference signal based on the system information. In a handover procedure, synchronization reconfiguration procedure, or connection reconfiguration procedure, the base station may transmit a dedicated control message including the configuration information of the common reference signal to the terminal.

The configured beam information may include at least one of a configured beam index (or identifier), configured TCI state index (or identifier), configuration information of each beam (e.g., transmission power, beam width, vertical angle, horizontal angle), transmission and/or reception timing information of each beam (e.g., subframe index, slot index, mini-slot index, symbol index, offset), reference signal information corresponding to each beam, and reference signal identifier.

In the exemplary embodiments, the base station may be a base station installed in the air. For example, the base station may be installed on an unmanned aerial vehicle (e.g., drone), a manned aircraft, or a satellite.

The terminal may receive configuration information of the base station (e.g., identification information of the base station) from the base station through one or more of an RRC message, MAC message, and PHY message, and may identify a base station with which the terminal performs a beam monitoring operation, radio access operation, and/or control (or data) packet transmission and reception operation.

The result of the measurement operation (e.g., beam monitoring operation) for the beam may be reported through a physical layer control channel (e.g., PUCCH) and/or a MAC message (e.g., MAC CE, control PDU). Here, the result of the beam monitoring operation may be a measurement result for one or more beams (or beam groups). For example, the result of the beam monitoring operation may be a measurement result for beams (or beam groups) according to a beam sweeping operation of the base station.

The base station may obtain the result of the beam measurement operation or the beam monitoring operation from the terminal, and may change the properties of the beam or the properties of the TCI state based on the result of the beam measurement operation or the beam monitoring operation. The beam may be classified into a primary beam, a secondary beam, a reserved (or candidate) beam, an active beam, and a deactivated beam according to its properties. The TCI state may be classified into a primary TCI state, a secondary TCI state, a reserved (or candidate) TCI state, a serving TCI state, a configured TCI state, an active TCI state, and a deactivated TCI state according to its properties. Each of the primary TCI state and the secondary TCI state may be assumed to be an active TCI state and a serving TCI state. The reserved (or candidate) TCI state may be assumed to be a deactivated TCI state or a configured TCI state.

A procedure for changing the beam (or TCI state) property may be controlled by the RRC layer and/or the MAC layer. When the procedure for changing the beam (or TCI state) property is controlled by the MAC layer, the MAC layer may inform the higher layer of information regarding a change in the beam (or TCI state) property. The information regarding the change in the beam (or TCI state) property may be transmitted to the terminal through a MAC message and/or a physical layer control channel (e.g., PDCCH). The information regarding the change in the beam (or TCI state) property may be included in downlink control information (DCI) or uplink control information (UCI). The information regarding the change in the beam (or TCI state) property may be expressed as a separate indicator or field.

The terminal may request to change the property of the TCI state based on the result of the beam measurement operation or the beam monitoring operation. The terminal may transmit control information (or feedback information) requesting to change the property of the TCI state to the base station by using one or more of a PHY message, a MAC message, and an RRC message. The control information (or feedback information, control message, control channel) requesting to change the property of the TCI state may be configured using one or more of the configured beam information described above.

The change in the property of the beam (or TCI state) may mean a change from the active beam to the deactivated beam, a change from the deactivated beam to the active beam, a change from the primary beam to the secondary beam, a change from the secondary beam to the primary beam, a change from the primary beam to the reserved (or candidate) beam, or a change from the reserved (or candidate) beam to the primary beam. The procedure for changing the property of the beam (or TCI state) may be controlled by the RRC layer and/or the MAC layer. The procedure for changing the property of the beam (or TCI state) may be performed through partial cooperation between the RRC layer and the MAC layer.

When a plurality of beams are allocated, one or more beams among the plurality of beams may be configured as beam(s) for transmitting physical layer control channels. For example, the primary beam and/or the secondary beam may be used for transmission and reception of a physical layer control channel (e.g., PHY message). Here, the physical layer control channel may be a PDCCH or a PUCCH. The physical layer control channel may be used for transmission of one or more among scheduling information (e.g., radio resource allocation information, modulation and coding scheme (MCS) information), feedback information (e.g., channel quality indication (CQI), preceding matrix indicator (PMI), HARQ ACK, HARQ NACK), resource request information (e.g., scheduling request (SR)), result of the beam monitoring operation for supporting beamforming functions, TCI state ID, and measurement information for the active beam (or deactivated beam).

The physical layer control channel may be configured to be transmitted through the primary beam of downlink. In this case, the feedback information may be transmitted and received through the primary beam, and data scheduled by the control information may be transmitted and received through the secondary beam. The physical layer control channel may be configured to be transmitted through the primary beam of uplink. In this case, the resource request information (e.g., SR) and/or the feedback information may be transmitted and received through the primary beam.

In the procedure of allocating the plurality of beams (or the procedure of configuring the TCI states), the allocated (or configured) beam indexes, information indicating a spacing between the beams, and/or information indicating whether contiguous beams are allocated may be transmitted and received through a signaling procedure between the base station and the terminal. The signaling procedure of the beam allocation information may be performed differently according to status information (e.g., movement speed, movement direction, location information) of the terminal and/or the quality of the radio channel. The base station may obtain the status information of the terminal from the terminal. Alternatively, the base station may obtain the status information of the terminal through another method.

The radio resource information may include parameter(s) indicating frequency domain resources (e.g., center frequency, system bandwidth, PRB index, number of PRBs, CRB index, number of CRBs, subcarrier index, frequency offset, etc.) and parameter(s) indicating time domain resources (e.g., radio frame index, subframe index, transmission time interval (TTI), slot index, mini-slot index, symbol index, time offset, and periodicity, length, or window of transmission period (or reception period)). In addition, the radio resource information may further include a hopping pattern of radio resources, information for beamforming (e.g., beam shaping) operations (e.g., beam configuration information, beam index), and information on resources occupied according to characteristics of a code sequence (or bit sequence, signal sequence).

The name of the physical layer channel and/or the name of the transport channel may vary according to the type (or attribute) of data, the type (or attribute) of control information, a transmission direction (e.g., uplink, downlink, sidelink), and the like.

The reference signal for beam (or TCI state) or radio link management may be a synchronization signal (e.g., PSS, SSS, SS/PBCH block), CSI-RS, PT-RS, SRS, DM-RS, or the like. The reference parameter(s) for reception quality of the reference signal for beam (or TCI state) or radio link management may include a measurement time unit, a measurement time interval, a reference value indicating an improvement in reception quality, a reference value indicating a deterioration in reception quality, or the like. Each of the measurement time unit and the measurement time interval may be configured in units of an absolute time (e.g., millisecond, second), TTI, symbol, slot, frame, subframe, scheduling periodicity, operation periodicity of the base station, or operation periodicity of the terminal.

The condition (e.g., reference value) indicating the change in reception quality may be configured as an absolute value (dBm) or a relative value (dB). In addition, the reception quality of the reference signal for beam (or TCI state) or radio link management may be expressed as a reference signal received power (RSRP), a reference signal received quality (RSRQ), a received signal strength indicator (RSSI), a signal-to-noise ratio (SNR), a signal-to-interference ratio (SIR), or the like.

Meanwhile, in the NR communication system using a millimeter frequency band, flexibility for a channel bandwidth operation for packet transmission may be secured based on a bandwidth part (BWP) concept. The base station may configure up to 4 BWPs having different bandwidths to the terminal. The BWPs may be independently configured for downlink and uplink. That is, downlink BWPs may be distinguished from uplink BWPs. Each of the BWPs may have a different subcarrier spacing as well as a different bandwidth. For example, BWPs may be configured as follows.

Figure 4:
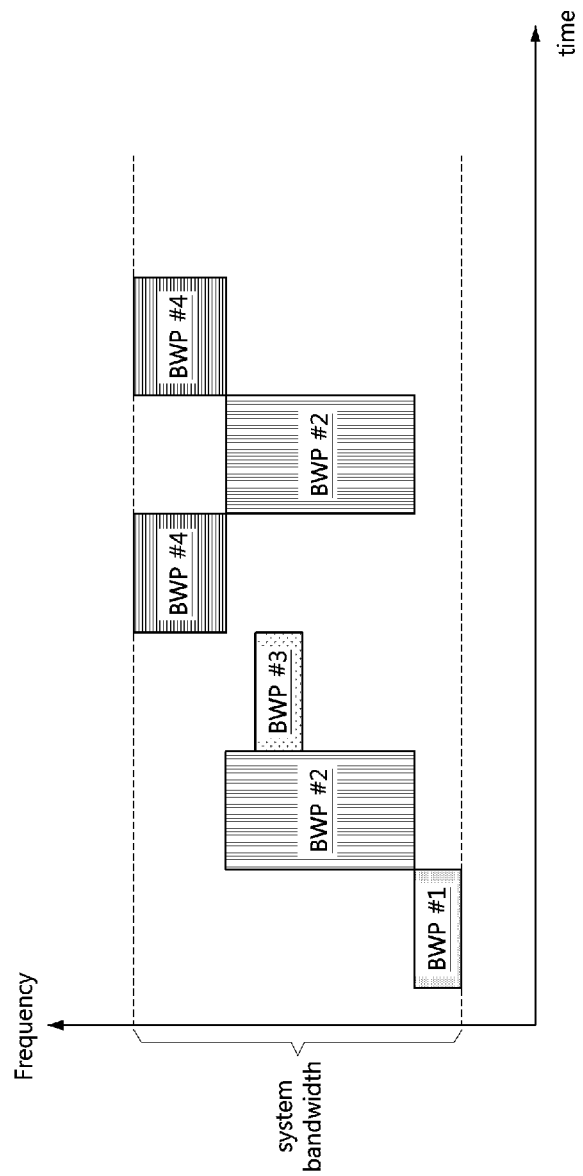
FIG. 4 is a conceptual diagram illustrating a first exemplary embodiment of a method for configuring bandwidth parts (BWPs) in a communication system.

FIG. 4 is a conceptual diagram illustrating a first exemplary embodiment of a method for configuring bandwidth parts (BWPs) in a communication system.

Referring to FIG. 4, a plurality of bandwidth parts (e.g., BWPs #1 to #4) may be configured within a system bandwidth of the base station. The BWPs #1 to #4 may be configured not to be larger than the system bandwidth of the base station. The bandwidths of the BWPs #1 to #4 may be different, and different subcarrier spacings may be applied to the BWPs #1 to #4. For example, the bandwidth of the BWP #1 may be 10 MHz, and the BWP #1 may have a 15 kHz subcarrier spacing. The bandwidth of the BWP #2 may be 40 MHz, and the BWP #2 may have a 15 kHz subcarrier spacing. The bandwidth of the BWP #3 may be 10 MHz, and the BWP #3 may have a 30 kHz subcarrier spacing. The bandwidth of the BWP #4 may be 20 MHz, and the BWP #4 may have a 60 kHz subcarrier spacing.

The BWPs may be classified into an initial BWP (e.g., first BWP), an active BWP (e.g., activated BWP), and a default BWP. The terminal may perform an initial access procedure (e.g., access procedure) with the base station in the initial BWP. One or more BWPs may be configured through an RRC connection configuration message, and one BWP among the one or more BWPs may be configured as the active BWP. Each of the terminal and the base station may transmit and receive packets in the active BWP among the configured BWPs. Therefore, the terminal may perform a monitoring operation on control channels for packet transmission and reception in the active BWP.

The terminal may switch the operating BWP from the initial BWP to the active BWP or the default BWP. Alternatively, the terminal may switch the operating BWP from the active BWP to the initial BWP or the default BWP. The BWP switching operation may be performed based on an indication of the base station or a timer. The base station may transmit information indicating the BWP switching to the terminal using one or more of an RRC message, a MAC message (e.g., MAC control element (CE)), and a PHY message (e.g., DCI). The terminal may receive the information indicating the BWP switching from the base station, and may switch the operating BWP of the terminal to a BWP indicated by the received information.

When a random access (RA) resource is not configured in the active uplink (UL) BWP in the NR communication system, the terminal may switch the operating BWP of the terminal from the active UL BWP to the initial UL BWP in order to perform a random access procedure. The operating BWP may be a BWP in which the terminal performs communication (e.g., transmission and reception operation of a signal and/or channel).

Measurement operations (e.g., monitoring operations) for beam (or TCI state) or radio link management may be performed at the base station and/or the terminal. The base station and/or the terminal may perform the measurement operations (e.g., monitoring operations) according to parameter(s) configured for the measurement operations (e.g., monitoring operations). The terminal may report a measurement result according to parameter(s) configured for measurement reporting.

When a reception quality of a reference signal according to the measurement result meets a preconfigured reference value and/or a preconfigured timer condition, the base station may determine whether to perform a beam (or, radio link) management operation, a beam switching operation, or a beam deactivation (or, activation) operation according to a beam blockage situation. When it is determined to perform a specific operation, the base station may transmit a message triggering execution of the specific operation to the terminal. For example, the base station may transmit a control message for instructing the terminal to execute the specific operation to the terminal. The control message may include configuration information of the specific operation.

When a reception quality of a reference signal according to the measurement result meets a preconfigured condition (e.g., reference value or threshold) and/or a preconfigured timer condition, the terminal may report the measurement result to the base station. Alternatively, the terminal may transmit to the base station a control message triggering a beam (or, radio link) management operation, a beam switching operation (or a TCI state ID change operation, a property change operation), or a beam deactivation operation (or a beam activation operation) according to a beam blockage situation. The control message may request to perform a specific operation.

A basic procedure for beam (or TCI state) management through the radio link monitoring may include a beam failure detection (BFD) procedure, a beam recovery (BR) request procedure, and the like for a radio link. An operation of determining whether to perform the beam failure detection procedure and/or the beam recovery request procedure, an operation triggering execution of the beam failure detection procedure and/or the beam recovery request procedure, and a control signaling operation for the beam failure detection procedure and/or the beam recovery request procedure may be performed by one or more of the PHY layer, the MAC layer, and the RRC layer.

Figure 5:
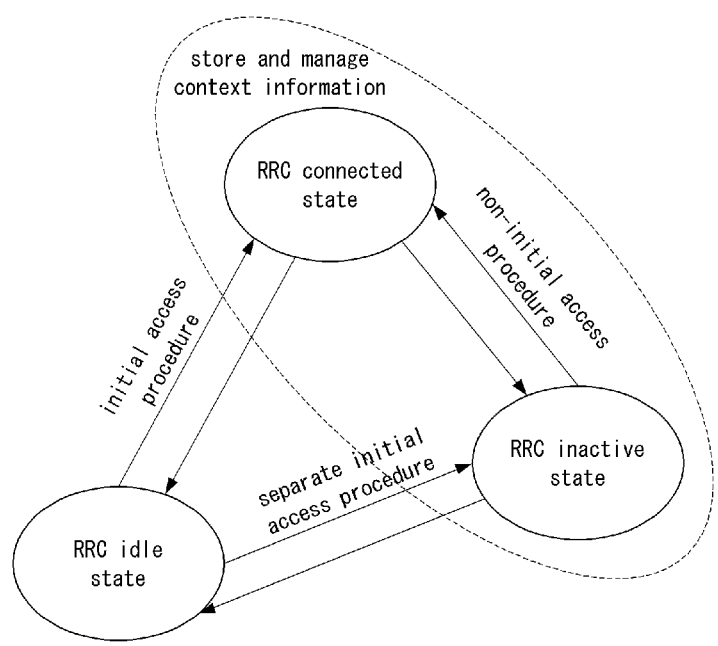
FIG. 5 is a conceptual diagram illustrating a first exemplary embodiment of operation states of a terminal in a communication system.

FIG. 5 is a conceptual diagram illustrating a first exemplary embodiment of operation states of a terminal in a communication system.

Referring to FIG. 5, operation states of the terminal may be classified into an RRC connected state, an RRC inactive state, and an RRC idle state. When the terminal operates in the RRC connected state or the RRC inactive state, a radio access network (RAN) (e.g., a control function block of the RAN) and the base station may store and manage RRC connection configuration information and/or context information (e.g., RRC context information, AS context information) of the corresponding terminal.

The terminal operating in the RRC connected state may receive configuration information of physical layer control channels and/or reference signals required for maintaining connection configuration and transmission/reception of data from the base station. The reference signal may be a reference signal for demodulating the data. Alternatively, the reference signal may be a reference signal for channel quality measurement or beamforming. Therefore, the terminal operating in the RRC connected state may transmit and receive the data without delay.

When the terminal operates in the RRC inactive state, mobility management functions/operations identical or similar to mobility management functions/operations supported in the RRC idle state may be supported for the corresponding terminal. That is, when the terminal operates in the RRC inactive state, a data bearer for transmitting and receiving data may not be configured, and functions of the MAC layer may be deactivated. Accordingly, the terminal operating in the RRC inactive state may transition the operation state of the terminal from the RRC inactive state to the RRC connected state by performing the non-initial access procedure to transmit data. Alternatively, the terminal operating in the RRC inactive state may transmit data having a limited size, data having a limited quality of service, and/or data associated with a limited service.

When the terminal operates in the RRC idle state, there may be no connection configuration between the terminal and the base station, and the RRC connection configuration information and/or context information (e.g., RRC context information, AS context information) of the terminal may not be stored in the RAN (e.g., a control function block of the RAN) and the base station. In order to transition the operation state of the terminal from the RRC idle state to the RRC connected state, the terminal may perform the initial access procedure. Alternatively, when the initial access procedure is performed, the operation state of the terminal may transition from the RRC idle state to the RRC inactive state according to determination of the base station.

The terminal may transition from the RRC idle state to the RRC inactive state by performing the initial access procedure or a separate access procedure defined for the RRC inactive state. When a limited service is provided to the terminal, the operation state of the terminal may transition from the RRC idle state to the RRC inactive state. Alternatively, depending on capability of the terminal, the operation state of the terminal may transition from the RRC idle state to the RRC inactive state.

The base station and/or the control function block of the RAN may configure condition(s) for transitioning to the RRC inactive state by considering one or more of the type, capability, and service (e.g., a service currently being provided and a service to be provided) of the terminal, and may control the operation for transitioning to the RRC inactive state based on the configured condition(s). When the base station allows the transition to the RRC inactive state or when the transition to the RRC inactive state is configured to be allowed, the operation state of the terminal may be transitioned from the RRC connected state or the RRC idle state to the RRC inactive state.

In a communication system, a multicast and broadcast service (hereinafter referred to as 'multicast and broadcast service (MBS)') may be provided in units of terminal(s) and/or a terminal group (hereinafter, 'MBS group' or 'MBS terminal group'). The MBS may mean a groupcast service. The MBS terminal group may include one or more terminals. A point-to-point (PTP) scheme (e.g., unicast scheme) may be a scheme in which one base station transmits a channel and/or signal to one terminal. A point-to-multipoint (PTM) scheme may be a scheme in which one base station transmits a channel and/or signal to an MBS terminal group. When the PTM scheme is used, the base station may transmit a channel and/or signal by using a group scheduling identifier. That is, for PTM transmission, the base station may apply a group scheduling identifier to transmit scheduling information on an MBS terminal group basis. The group scheduling identifier may be configured as one or more MB S-radio network temporary identifiers (MBS-RNTIs), one or more group (G)-RNTIs, or one or more group common (GC)-RNTIs for multicast, groupcast, and/or broadcast transmission in units of MBS terminal group(s). The above-described RNTI for an MBS terminal group may be referred to as an MBS group (MG)-RNTI.

The base station may provide an MBS in a multicast scheme, a broadcast scheme, and/or a groupcast scheme (hereinafter, referred to as 'PTM scheme'). The broadcast scheme may be a scheme of providing the MBS to all terminals (e.g., all terminals capable of receiving the MBS) within a service coverage of the base station. The multicast scheme may be a scheme in which the MBS is limitedly provided to terminals allowed to be provided with multicast services within the service coverage of the base station. The groupcast scheme may be a method of providing the MBS to a specific terminal group (e.g., MBS terminal group) within the service area of the base station. The groupcast scheme may be the same as or similar to the multicast scheme. In exemplary embodiments, operations for the multicast scheme may be applied identically or similarly to the groupcast scheme.

In order to transmit/receive MBS packets in the multicast scheme, a join to a multicast service may be required for a terminal. For the multicast service, the terminal may perform a multicast service join procedure in a network registration step, a connection establishment step with a base station, a connection (re)configuration step, and/or a step for trigger/initiation/start of the MBS according to the multicast scheme. A procedure of releasing/terminating the joining of the multicast service may be performed when the multicast service is terminated. Alternatively, the procedure of releasing/terminating the joining of the multicast service may be performed according to determination of the base station (or network).

Figure 6:
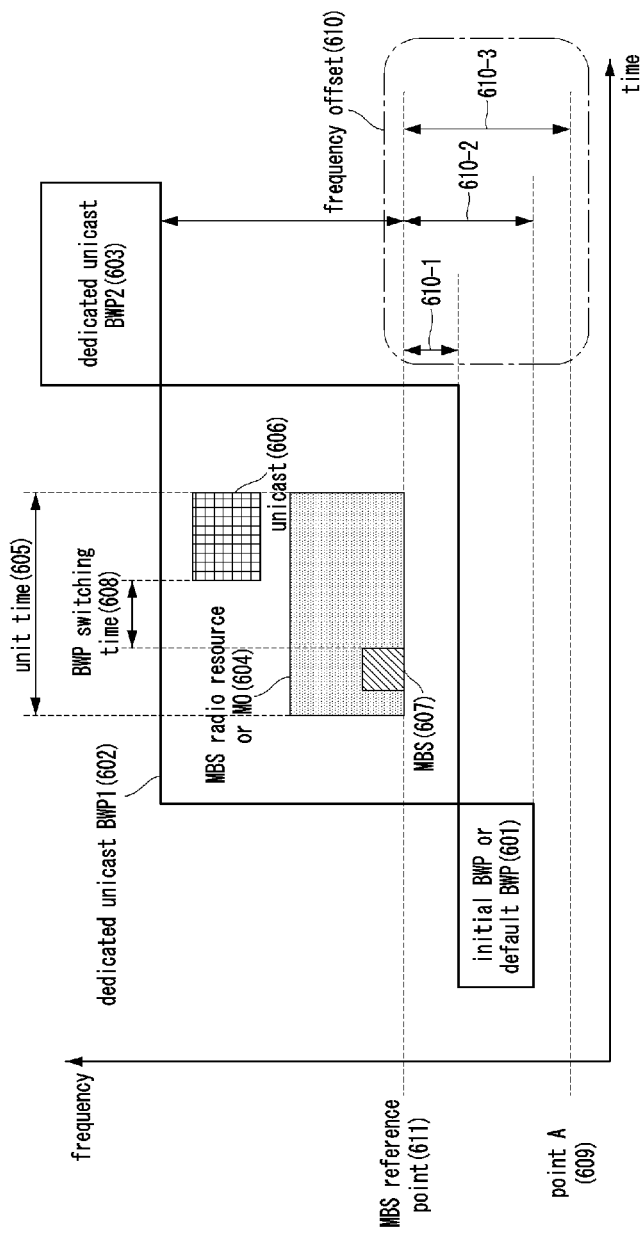
FIG. 6 is a conceptual diagram illustrating a first exemplary embodiment of a method for configuring an MBS resource within a BWP.

FIG. 6 is a conceptual diagram illustrating a first exemplary embodiment of a method for configuring an MBS resource within a BWP.

Referring to FIG. 6, one or more BWPs 601, 602, and/or 603 may be configured in a terminal, and an MBS resource (e.g., MBS radio resource) may be configured as follows in a unicast BWP (e.g., dedicated unicast BWP) configured in the terminal. 601 may indicate an initial BWP or a default BWP. 602 may indicate a dedicated unicast BWP1. 603 may indicate a dedicated unicast BWP2. One BWP (e.g., 602) among the one or more BWPs may be activated for the terminal. That is, a base station may transmit information indicating activation of one BWP among the one or more BWPs configured in the terminal to the terminal. In the RRC connected state, the terminal may transmit/receive a channel and/or signal by using the active BWP 602 among the BWP(s) 601, 602, and/or 603 configured in the corresponding terminal. In the RRC idle state or RRC inactive state, the terminal may transmit/receive a channel and/or signal by using the initial or default BWP 601.

The base station may configure (e.g., signal) a separate BWP for MBS (e.g., MBS-specific BWP, MBS-dedicated BWP, or MBS BWP) to a terminal and/or an MBS terminal group. The above-described separate BWP may be referred to as 'MBS BWP'. The MBS BWP may be configured within or outside a frequency resource region of a dedicated unicast BWP configured in the terminal. The dedicated unicast BWP may be a BWP configured for unicast service or a BWP configured for non-MBS. Frequency resource configuration information (e.g., frequency resource configuration parameters) of the MBS BWP may be configured as being associated with (or corresponding to) frequency resource configuration information (e.g., frequency resource configuration parameters) of the dedicated unicast BWP configured in the terminal. A mapping relationship between the frequency resource configuration information of the MBS BWP and the frequency resource configuration information of the dedicated unicast BWP may be configured, and the frequency resource configuration information of the MBS BWP may be configured based on the above-described mapping relationship. That is, frequency resources of the MBS BWP may be determined based on the mapping relationship with frequency resources of the dedicated unicast BWP.

When the MBS BWP is configured within the dedicated unicast BWP, the MBS BWP within the active BWP 602 may be configured to the terminal in the RRC connected state. 604 shown in FIG. 6 may indicate the MBS BWP. The MBS BWP within the initial BWP (or default BWP) 601 may be configured in the terminal in the RRC idle state or the RRC inactive state. The position in which the MBS BWP is configured (e.g., type of BWP) may vary depending on the operation state (e.g., RRC connected state, RRC inactive state, or RRC idle state) of the terminal.

When the MBS BWP is configured, the terminal may perform a monitoring operation on control channels (e.g., PDCCH, DCI, CORESET) for MBS (e.g., MBS data transmission), and may receive an MBS packet on a data channel (e.g., PDSCH) within the MBS BWP based on information element(s) (e.g., scheduling information) obtained through a control channel. A control channel for MBS may be referred to as 'MBS PDCCH', and a data channel for MBS may be referred to as 'MBS PDSCH'. When the MBS BWP is configured, the MBS PDCCH may be transmitted within the MBS BWP. The MBS PDCCH and the MBS PDSCH may be configured within the MBS BWP.

In order to provide an MBS without configuring the MBS BWP, the base station may configure (e.g., signal) a radio resource region (hereinafter, referred to as 'MBS resource region') for MBS packet transmission to a terminal or an MBS terminal group. The MBS resource region may be the MBS radio resource (or MO 604) or the MBS BWP configured for MBS transmission shown in FIG. 6. The MBS resource region 604 may be configured to be common to the terminal(s) or MBS terminal group. In this case, the terminal may perform a monitoring operation on MBS PDCCHs in the MBS resource region 604, and based on information element(s) (e.g., scheduling information) obtained through a control channel, the terminal may receive an MBS packet on a data channel (e.g., MBS PDSCH) within the MBS resource region 604.

Radio resources (e.g., MBS CORESET resources) for MBS PDCCH may be configured independently of CORESET resources for unicast service. Therefore, regardless of configuration of the MBS BWP, when MBS is provided to the terminal in the multicast scheme, broadcast scheme, or PTM scheme, the terminal may perform a monitoring operation on the MBS CORESET, and may receive MBS packets in the MBS resource region 604 based on information element(s) (e.g., scheduling information) obtained through the MBS CORESET.

When the MBS BWP is configured, the MBS PDCCH may be transmitted within the MBS BWP. When the MBS CORESET is not separately configured, the MBS PDCCH resources may be configured as some resources within the MBS resource region 604. Therefore, when the MBS CORESET is not separately configured, the MBS PDCCH may be transmitted in a CORESET configured within the MBS BWP or a CORESET configured within the dedicated unicast BWP.

The MBS PDCCH may be transmitted using a scheduling identifier assigned to the terminal (e.g., UE-specific RNTI) or a group scheduling identifier for MBS (e.g., MG-RNTI). One or more MG-RNTIs may be allocated for MBS PDCCH transmission (e.g., DCI transmission). When an MBS CORESET is separately configured for MBS PDCCH transmission, an MG-RNTI may be configured to be associated with (e.g., correspond to) a position of resources of the MBS CORESET. A mapping relationship between the MG-RNTI and the resources of the MBS CORESET may be established, and the MG-RNTI may be determined based on the above-described mapping relationship. When one or more MG-RNTIs are configured, the base station may transmit the MG-RNTI to the terminal using system information and/or MBS configuration information. The MG-RNTI may be configured for each MBS CORESET. Here, the MBS configuration information may be transmitted to the terminal in form of system information, MBS control channel (e.g., MBS control channel (MCCH)), and/or RRC layer control message (e.g., RRC reconfiguration message or on-demand based MCCH message).

When the mapping relationship is established between the MG-RNTI and the position of resources of the MBS CORESET, the base station may deliver only information on the MBS CORESET (e.g., MBS CORESET index and/or position of resources of the MBS CORESET) to the terminal by using system information and/or MBS configuration information. Accordingly, the terminal may identify the MG-RNTI for its own MBS service by using the MBS CORESET information.

In addition, for terminal(s) in the RRC inactive state or the RRC idle state, a separate MBS CORESET and/or a separate MG-RNTI may be allocated (or configured). In this case, terminal(s) in the RRC connected state may not perform a monitoring operation on the MBS CORESET or MG-RNTI allocated (or configured) for terminal(s) in the RRC inactive state or RRC idle state. Terminal(s) in the RRC inactive state or the RRC idle state may not perform a monitoring operation on the MBS CORESET or MG-RNTI allocated (or configured) for terminal(s) in the RRC connected state.

When the MBS BWP is configured within the dedicated unicast BWP, the MBS resource region 604 within the active BWP 602 may be configured to the terminal in the RRC connected state. Here, the MBS resource region 604 may mean the MBS BWP. For the terminal in the RRC idle state or RRC inactive state, the MBS resource region within the initial BWP or default BWP 601 may be configured.

Configuration parameters indicating the MBS BWP and/or the MBS resource region mean configuration information (i.e., 'MO configuration information') for a radio resource occasion for MBS provision (hereinafter, referred to as 'MBS occasion MO)'). The MO configuration information may be included in the MBS configuration information. Alternatively, the MO configuration information may be configured in form of RRC layer control message, MAC layer control message (e.g., MAC control element, MAC sub-header, MAC sub-PDU, etc.), and/or control field of a physical layer control channel. The MO configuration information may include frequency domain configuration information configured based on subcarrier(s), resource block(s) (RB(s)), and/or subband(s), and time domain configuration information configured based on radio frame(s), subframe (s), slot(s), mini-slot(s), and/or symbol(s). The frequency domain configuration information may be referred to as 'frequency domain resource allocation information', and the time domain configuration information may be referred to as 'time domain resource allocation information'.

The frequency domain configuration information and/or time domain configuration information may be transmitted to the terminal in form of system information, MCCH, and/or RRC layer control message (e.g., RRC reconfiguration message or on-demand based MCCH message).

The frequency domain configuration information may include information on a reference point for a frequency resource of an MO (e.g., MBS radio resource, MBS resource region, MBS BWP), information on an offset from the reference point, information indicating a start point, and information indication the number of PRBs. The start point may indicate a frequency resource (e.g., subcarrier or PRB) where the MO starts in the frequency domain. The start point may be indicated by the reference point and the offset. The number of PRBs may indicate the number of PRBs constituting the MO in the frequency domain. The reference point of the frequency resource constituting the MBS BWP and/or the MBS resource region may be the reference point or the PRB defined in Table 1 below.

TABLE 1

| Description |
| --- |
| A reference point of PRB(s) constituting a downlink radio resource of MO (e.g., point A in the NR system). The point A may be a point A shown in FIG. 6. |
| A reference index of an MBS subcarrier configured for indicating a start PRB of MO (611 of FIG. 6) |
| A start PRB of a dedicated unicast BWP configured to the terminal |
| A start PRB of an initial BWP or a default BWP configured to the |

TABLE 1-continued

Description terminal
A start PRB of an MBS CORESET configured for MBS PDCCH transmission
An end PRB or last PRB of an MBS CORESET for MBS PDCCH transmission For example, a first frequency offset 610-1 among frequency offsets 610 indicating a start point of the MBS radio resource or MO 604 may indicate that a start PRB of the dedicated unicast BWP1 602 configured to the terminal is a frequency reference point of the MBS radio resource 604. A second frequency offset 610-2 may indicate that a start PRB of the initial BWP or default BWP 601 configured to the terminal is the frequency reference point of the MBS radio resource 604. A third frequency offset 610-3 may indicate that a reference point (e.g., point A of the NR system) of PRB(s) constituting a downlink radio resource is the frequency reference point of the MBS radio resource 604. When the reference point of the frequency resource constituting MO, MBS radio resource, MBS BWP, and/or MBS resource region is configured based on the dedicated unicast BWP1 602, information on a BWP index indicating the dedicated unicast BWP1 602 may be included in the frequency domain configuration information.

The time domain configuration information may mean allocation information or configuration information of the MO (or MBS radio resource) 604. For example, the time domain configuration information may include information on a periodicity of the MO 604, information on a time reference point of the MO 604, information on an offset from the reference point, information indicating a start point, information indicating an end point, information on an allocation length/duration/window of the MO in the time domain, and/or semi-persistent scheduling (SPS) (or configured scheduling (CS)) configuration information for the MO. Here, the SPS configuration information (or CS configuration information) may be MO allocation information for periodically transmitting MBS packets (e.g., MBS data). The SPS configuration information may include periodic allocation information for the MO (or MBS radio resource) 604 for MBS provision.

The SPS configuration information may be allocated (or configured) based on an identifier for identifying MBS (e.g., service ID, session ID, temporary mobile group identity (TMGI), MBS bearer identifier, or MBS logical channel identifier (LCID), etc.), MG-RNTI for MBS provision, and/or an MO for MBS provision. Here, the MBS bearer may mean a radio bearer for MBS provision (i.e., MBS radio bearer (MRB)). The MBS bearer may be distinguished from a data radio bearer (DRB) for non-MBS (or unicast service). Alternatively, the SPS configuration information may be allocated based on an MBS CORESET (or MBS CORESET identifier). In consideration of beam (or TCI state ID) management for MBS provision, the SPS configuration information (e.g., SRS parameters) may be configured to have a corresponding relationship in units of SSB (or PBCH). Alternatively, the SPS configuration information (e.g., SRS parameters) may be configured in consideration of a TCI state ID for a PDCCH (or DCI) and/or PDSCH for MBS provision.

An MO according to the SPS configuration (or CS configuration) may be allocated so that the terminal can receive MBS packets by monitoring a valid MO (or active MO), MBS PDCCH (or MBS CORESET), and/or PDSCH. Here, radio resources for MBS provision may be scheduled periodically in the time domain. Accordingly, the terminal may receive MBS packets by monitoring a valid MO (or active MO), MBS PDCCH (or MBS CORESET), and/or PDSCH according to an SPS periodicity (or CS periodicity). In particular, when the PTM scheme is used, the terminal may identify existence of MBS packet(s) by performing MG-RNTI monitoring according to the SPS periodicity (or CS periodicity).

For a periodic discontinuous reception (DRX) operation, a DRX cycle for MBS (hereinafter, referred to as 'MBS DRX cycle') may be configured. The MBS DRX cycle may be configured on an MBS terminal group basis. The MBS DRX cycle may mean an MBS DRX period. When another DRX cycle for a discontinuous reception operation is configured for the terminal, the MBS DRX cycle may be applied prior to another DRX cycle. Alternatively, another DRX cycle may be replaced with the MBS DRX cycle. Another DRX cycle may mean a sidelink (SL)-DRX cycle for a sidelink (SL) channel or a DRX cycle for a Uu interface between a base station and the terminal configured according to the RRC connection state.

When the above-described MBS DRX cycle is not configured, the terminal that is an MBS target may perform a discontinuous reception operation according to the SPS allocation periodicity (or CS allocation periodicity). Without configuration of the MBS DRX cycle, the terminal may perform a discontinuous reception operation according to another DRX cycle. In this case, the terminal may perform an MBS reception operation for MBS by monitoring a valid MO (or active MO), MBS PDCCH (or MBS CORESET), and/or PDSCH even in a sleep period according to another DRX cycle.

The base station may indicate (e.g., configure, signal) to the terminal whether to perform a monitoring operation on MO, PDCCH (or CORESET), and/or PDSCH according to the SPS configuration periodicity (or CS configuration periodicity). The information (e.g., activation indication information or deactivation indication information) indicating whether to perform the above-described monitoring operation may be transmitted in form of physical layer control information and/or MAC layer control information (e.g., MAC CE). The indication information (hereinafter, referred to as 'MBS monitoring indication information') of whether to perform the monitoring operation on MO, PDCCH (or, CORESET), and/or PDSCH (e.g., activation or deactivation of the monitoring operation) may be an indicator for activation or deactivation of a next MO, PDCCH (or CORESET), and/or PDSCH, or an indicator for activation or deactivation of an upcoming MO, PDCCH (or, CORESET), and/or PDSCH.

The MBS monitoring indication information may be transmitted in a specific region of PRB(s) constituting the MBS PDCCH (or MBS CORESET) or the MBS PDSCH. Here, the specific region of the PRB(s) may mean a pre-designated region in time domain and/or frequency domain radio resources constituting the PRB(s). Alternatively, "the MBS monitoring indication information is transmitted in a specific region of PRB(s)" may mean "the MBS monitoring indication information is configured in a pre-specified form in a frontmost (or backmost) part of an MBS packet". The configuration according to the pre-specified form may mean that MBS monitoring indication information (e.g., information indicating a radio resource to be monitored) is configured in form of a specific value or a bitmap.

When the MBS monitoring indication information is configured as a bitmap, each bit of the bitmap may indicate activation or deactivation of each upcoming MO, PDCCH (or, CORESET), and/or PDSCH. When the MBS monitoring indication information is configured as a specific value, this may indicate that the upcoming MO, PDCCH (or CORESET), and/or PDSCH is activated or deactivated by an amount (or, duration) corresponding to the specific value. The MBS monitoring indication information may be transmitted using an MCCH, multicast traffic channel (MTCH), or dedicated traffic channel (DTCH). The MBS monitoring indication information may be transmitted on a PDCCH (e.g., DCI) or PDSCH that is a physical layer channel. When the MBS monitoring indication information is configured in form of an MAC CE, the MBS monitoring indication information may be configured in form of the above-described bitmap or specific value together with an LCID indicating activation and/or deactivation. The MAC CE may be configured in form of a MAC sub-header, MAC header, MAC sub-PDU, and/or MAC PDU.

Alternatively, the monitoring operation on MO, PDCCH (or CORESET), and/or PDSCH may be controlled using MBS scheduling information. For example, for each MBS session, MBS ID, MBS radio bearer, and/or MBS terminal group, the base station may configure an MBS scheduling period or a time domain duration (hereinafter, 'valid duration') in which MBS scheduling information is valid. The valid duration may be configured (e.g., signaled) to the terminal. The terminal may perform the monitoring operation on MO, PDCCH (or CORESET), and/or PDSCH according to the MBS scheduling information (e.g., SPS configuration information) in the valid duration. When information indicating stop (or termination) of monitoring on the MBS session, MBS ID, MBS radio bearer, and/or MBS terminal group is received from the base station before the MBS scheduling period or valid duration ends, the terminal may not perform the monitoring operation on MO, PDCCH (or, CORESET), and/or PDSCH in the remaining period of the MBS scheduling period or valid duration. When a new MBS scheduling period or a new valid duration is started, the terminal may start the monitoring operation on MO, PDCCH (or CORESET), and/or PDSCH. The information indicative of stopping (or terminating) the monitoring operation may be delivered to the terminal in form of control information (e.g., DCI) of a physical layer control channel or MAC CE. When the information indicative of stopping (or terminating) the monitoring operation is transmitted in form of an MAC CE, the information indicative of stopping (or terminating) the monitoring operation may be configured in form of a MAC sub-header, MAC header, MAC sub-PDU, and/or MAC PDU. As another scheme, the MAC CE may include only an LCID indicative of stopping (or terminating) the monitoring operation, and the base station may transmit the above-described MAC CE to the terminal.

The MBS may be provided to a terminal in the RRC connected state through the MBS BWP, and two active BWPs may be configured to the terminal. The two active BWPs may be one BWP of the dedicated unicast BWPs and the MBS BWP. The terminal in the RRC connected state may receive MBS packets and unicast service packets together by using the two active BWPs. The MBS packet may mean MBS data, and the unicast service packet or unicast packet may mean unicast data. When two active BWPs are configured, the base station may transmit MBS packets and unicast service packets with a time interval equal to or longer than a BWP switching time (e.g., 608 in FIG. 6) according to capability of the terminal. That is, the interval between transmission of MBS packets and transmission of unicast packets may be greater than or equal to the BWP switching time 608. The base station may configure (e.g., signal) information of the BWP switching time 608 to the terminal. The information of the BWP switching time 608 may be included in BWP configuration information (e.g., unicast BWP configuration information and/or MBS BWP configuration information). The terminal may receive the BWP configuration information from the base station, and may identify the information of the BWP switching time 608 included in the BWP configuration information.

When the terminal in the RRC connected state cannot simultaneously perform the reception operations in the two active BWPs, the terminal may first perform a monitoring operation on MBS PDCCH(s) and/or MBS CORESET within the MBS BWP, and may receive MBS packets in MBS radio resources based on a result of the monitoring. Thereafter, the terminal may switch the operating BWP to the active BWP for unicast service, perform a monitoring operation on PDCCH(s) for unicast service, and receive unicast packets in the active BWP based on a result of the monitoring operation. If the result of the monitoring operation on MBS PDCCH(s) and/or MBS CORESET within the MBS BWP indicates "reception of MBS packets is not required" or "MBS packets to be received do not exist", the terminal may switch the operating BWP to the active BWP for unicast service, perform a monitoring operation on PDCCH(s) for unicast service, and receive unicast packets within the active BWP based on the result of the monitoring operation. Alternatively, if the result of the monitoring operation on PDCCH(s) within the unicast BWP indicates "reception of unicast packets is not required" or "unicast packets to be received do not exist", the terminal may switch the operating BWP to the MBS BWP, perform a monitoring operation for MBS PDCCH(s) and/or MBS CORESET for MBS service, and receive MBS packets within the MBS BWP based on the result of the monitoring operation.

When the MBS BWP is not configured, the terminal may receive MBS packets in the MO 604 within the active BWP 602 of the dedicated unicast BWP, and receive unicast service packets in the unicast radio resource 606 within the active BWP 602. The unicast radio resource 606 may be a radio resource through which unicast data is transmitted within the dedicated unicast BWP1. If it is not allowed to receive MBS packets and unicast service packets together within a unit time 605, MBS packets and unicast service packets may be transmitted in different scheduling units and/or in different slots (or mini-slots, subframes). The unit time 605 may be a mini-slot, a slot, or a subframe. Alternatively, the terminal may receive either MBS packets or unicast service packets in the same scheduling unit and/or in the same slot (or mini-slot, subframe).

The terminal in the RRC inactive state or the RRC idle state may receive MBS packets in the MO (or MBS radio resource) by monitoring the MBS CORESET (or MG-RNTI). In this case, when a separate MBS CORESET and/or a separate MG-RNTI is allocated (or configured) to the terminal in RRC inactive state or RRC idle state, the terminal in the RRC inactive state or RRC idle state may identify an MO (or MBS radio resource) by monitoring MBS PDCCH(s) based on the MBS CORESET and/or MG-RNTI allocated (or configured) to the terminal in the RRC inactive state or RRC idle state, and may receive MBS packets in the identified MO (or MBS radio resource). When the MBS is provided to the terminal by using the MO (or MBS radio resource) 604, the terminal may perform an operation of receiving unicast packets 606 in the active BWP (or initial/default BWP) among the dedicated unicast BWPs and an operation of receiving MBS packets 607 in the MO (or MBS radio resource) together in one unit time 605 within a downlink channel. In FIG. 6, 607 may indicate the MBS radio resource or the radio resource through which MBS data is transmitted within the MO 604. The unit time 605 may be one mini-slot, one slot, or one subframe.

Information of the minimum time period (e.g., BWP switching time) 608 considering the BWP switching time (or frequency retuning time) required for reception of unicast packets and MBS packets within the unit time 605 may be included in the time domain information (e.g., time domain resource allocation information). Alternatively, the information of the BWP switching time 608 may be configured as a lower field parameter of system information. During the minimum time period (e.g., BWP switching time) 608, the terminal may not perform the operation of receiving unicast packets in the dedicated unicast BWP1 602 and/or the operation of receiving MBS packets in the MO 604. That is, during the BWP switching time 608, the operation of receiving unicast packets in the dedicated unicast BWP1 602 and/or the operation of receiving MBS packets in the MO 604 may not need to be performed.

When the MBS BWP is configured, the MBS BWP configuration information and the unicast BWP configuration information may be identically or differently configured. The configuration information may include a subcarrier spacing (SCS) and/or a cyclic prefix (CP). When the MBS BWP configuration information (e.g., SCS and/or CP) is configured differently from the unicast BWP configuration information, the base station may use the MBS BWP configuration information or system information to deliver an SCS and/or CP of the MBS BWP to the terminal. When a reference of configuration parameters indicating the MO (or MBS BWP and/or MBS resource region) 604 is the dedicated unicast BWP1 602, the configuration parameters of the MO 604 in the frequency domain and/or time domain may be configured based on an SCS and/or CP of the dedicated unicast BWP1 602. If the reference of the configuration parameters indicating the MO (or MBS BWP and/or MBS resource region) 604 is the MBS BWP, the configuration parameters of the MO 604 in the frequency domain and/or time domain may be configured based on an SCS or CP of the MBS BWP.

The base station may transmit control information for MBS provision to the terminal using system information and/or an MBS control channel (e.g., MCCH). A terminal desiring to receive MBS may receive an MCCH (e.g., control information for MBS provision) transmitted in the broadcast scheme. Alternatively, the terminal may receive the control information for MBS provision based on an on-demand broadcast scheme or an on-demand-based based unicast scheme.

For beam management in a procedure of PDCCH or PDSCH reception for unicast service, the base station may configure a plurality of TCI states (e.g., TCI state IDs) for PDCCH and PDSCH. The plurality of TCI states may be configured (e.g., signaled) to the terminal. The base station may activate or deactivate each of the plurality of TCI state IDs for PDCCH and/or PDSCH. The base station may transmit a PDCCH and/or PDSCH for a unicast service by using the active TCI state ID. Accordingly, the terminal may receive unicast service packets by monitoring/identifying (or receiving) the PDCCH and/or PDSCH corresponding to the active TCI state ID.

In reception procedure for an MO for MBS provision and a downlink channel for unicast service, a beam management method may be required. The beam management method may include a TCI allocation method, a TCI activation method, and/or a TCI deactivation method.

The base station may configure a plurality of TCI state IDs for reception of an MBS PDCCH (or MBS CORESET) and an MBS physical layer downlink channel (hereinafter, referred to as 'MBS PDSCH'). The plurality of TCI state IDs may be configured (e.g., signaled) to the terminal. That is, one or more TCI state IDs for MBS may be configured. An MBS TCI state ID may be configured to be distinguished from a TCI state ID for unicast service reception. The MBS TCI state ID may mean 'TCI state ID for MBS'.

The terminal, which is an MBS target, may perform not only a monitoring operation/reception operation for a PDCCH (or CORESET) and/or PDSCH corresponding to the active TCI state ID for unicast reception but also a monitoring operation/reception operation for an MBS PDCCH (or MBS CORESET) and/or MBS PDSCH corresponding to the MBS TCI state ID. The terminal may identify whether MBS packets are to be received (or exist) by monitoring the MBS PDCCH corresponding to the active MBS TCI state ID. If there are MBS packets to be received, the terminal may receive MBS packets on the MBS PDSCH corresponding to the MBS TCI state ID.

The TCI state ID of the PDCCH and/or MBS PDCCH for MCCH transmission may be configured to correspond to a PBCH (or SSB) or a reference signal (e.g., MBS-RS) configured for MBS. The terminal may search/measure a PBCH (or SSB) or MBS-RS, may select a TCI state ID (or beam) satisfying a preconfigured radio channel quality condition (e.g., threshold) based on a result of the measurement, and may monitor only an MBS PDCCH (or MBS CORESET) corresponding to the selected TCI state ID. In addition, the base station may indicate (configure) the MBS PDCCH and/or the TCI state ID of the MBS PDCCH to the terminal (or MBS terminal group) by using control field information of the PDCCH (or DCI) in the unicast BWP.

For MBS provision, the active TCI state ID associated with the MBS PDCCH and the active TCI state ID associated with the MBS PDSCH may be the same or different. When the same TCI state ID is applied, the terminal may select the TCI state ID of the MBS PDCCH based on the above-described method, and may receive the MBS packet by using the MBS PDSCH corresponding to the selected TCI state ID (e.g., the same TCI state ID). When different TCI state IDs are applied, the terminal may receive the MBS packet by using the MBS PDSCH corresponding to the TCI state ID different from the TCI state ID of the MBS PDCCH.

The TCI state ID of the PRB of the downlink channel (e.g., PDSCH or MBS PDSCH) for MCCH transmission and/or the MBS PDSCH for MBS packet transmission may be delivered to the terminal in a combination of one or more of the schemes defined in Table 2 below.

TABLE 2

| Schemes |
|---|
| Apply a TCI state ID identical to a TCI state ID of an MBS PDSCH to an MBS PDCCH |
| Transmit an MBS PDCCH including a TCI state ID of an MBS PDSCH |
| Derive a TCI state ID of an MBS PDSCH by using a mapping relationship (e.g., correspondence relationship) with respect to a TCI state ID of an MBS PDCCH (or MBSCORESET) |
| Derive a TCI state ID of an MBS PDSCH by using a mapping relationship (e.g., correspondence relationship) with an MBS PDCCH (or MBS CORESET) |
| Select a TCI state ID of an MBS PDSCH satisfying a preconfigured radio |

TABLE 2-continued

| Schemes |
|---|
| channel quality condition (e.g., threshold) based on measurement results of PBCH(s) (or SSB(s)) or MBS-RS(s). |
| Indicate a TCI state ID of an MBS PDSCH by using control field information of a PDCCH (or DCI) of a unicast BWP |

The mapping relationship (e.g., correspondence relationship) with the MBS PDCCH (or MBS CORESET) may mean a mapping relationship between configuration information of the PRB designated for MBS PDCCH (or MBS CORESET) transmission and the TCI state ID of the MBS PDSCH or a mapping relationship between the MBS CORESET identifier and the TCI state ID of the MBS PDSCH. The above-described mapping relationship (e.g., correspondence relationship) may be predefined in communication nodes (e.g., base station and/or terminal). Alternatively, the base station may transmit information of the mapping relationship (e.g., correspondence relationship) to the terminal using system information and/or MBS configuration information.

The base station may transmit activation indication information or deactivation indication information for the TCI state ID of the MBS PDCCH and/or the MBS PDSCH to the terminal by using an MAC CE or MBS PDCCH. The terminal may receive the MBS PDCCH and/or the MBS PDSCH by performing a monitoring operation for the active TCI state ID indicated by the base station.

In order to receive MBS packets transmitted in the multicast scheme, the terminal may report, to the base station, information (e.g., index, ID, or, identifier) on a reference signal (e.g., PBCH, SSB, CSI-RS, and/or MBS-RS) for MBS reception satisfying a radio channel quality condition (e.g., threshold) preconfigured in the step of joining the corresponding multicast service and/or the step of requesting MBS provision (or start) in the multicast scheme, or a TCI state ID corresponding to the reference signal.

The base station may transmit (e.g., signal) MBS configuration information to the terminal using system information, an RRC layer control message, and/or an MCCH. The MBS configuration information may include MBS session configuration information, MO PRB configuration information, channel configuration information for MBS transmission, and/or MBS scheduling information. The MO PRB configuration information may be configuration information on PRBs constituting the MO. The MO PRB configuration information may include one or more information elements defined in Table 3 below.

TABLE 3

| Information elements |
|---|
| MBS BWP identifier |
| Configuration information of PRB(s) (e.g., PRB reference point, offset parameter, etc.) for an MBS CORESET and/or MBS PDSCH in the frequency domain, in which MO (or MBS radio resource) is configured |
| Configuration information of PRB(s) (e.g., SPS configuration information, periodicity of MBS PDCCH (or CORESET), periodicity of MBS PDSCH, PRB reference point, offset parameter, etc.) for an MBS CORESET and/or MBS PDSCH in the time domain, in which MO (or MBS radio resource) is configured MG-RNTI configuration information |

The system information for MCCH reception may include not only the MBS configuration information described above, but also MCCH configuration information for terminal(s) desiring MBS reception, configuration information for on-demand MCCH reception, and/or configuration information of a scheduling identifier for MCCH transmission (hereinafter referred to as 'MCCH-RNTI').

The MCCH configuration information included in the MBS configuration information may include configuration information of PRBs (or MCCH occasion) for MCCH transmission. The MCCH occasion may be referred to as 'MCCH MO'. The MCCH MO configuration information may include a periodicity of the MCCH MO, time information indicating validity of the MCCH MO (e.g., information indicating a time during which the MCCH MO is valid), and/or MCCH change time information. The MCCH MO configuration information may mean configuration information of PRB(s) preconfigured only for MCCH transmission in the frequency domain and/or time domain. Alternatively, the MCCH MO configuration information may mean configuration information of PRB(s) preconfigured only for MCCH reception in the frequency domain and/or time domain.

The configuration information of the MCCH MO indicated (or configured) separately from the MO may mean configuration information of a position of PRB(s) within the above-described MO or configuration information of a position of PRB(s) within a downlink channel radio resource region instead of the MO. When the MCCH MO is located in the downlink channel radio resource region within the MO, the MCCH MO may indicate a part of the PRB constituting the above-described MO. When the MCCH MO may indicate a portion of the PRB(s) constituting the above-described MO. When the MCCH MO is located in the downlink channel radio resource region instead of the MO, the MCCH MO may indicate PRB(s) of the downlink channel radio resource region other than the PRB(s) constituting the above-described MO. The MCCH MO configuration information may be configuration information for PRB(s) constituting the MCCH MO. The MCCH MO configuration information may include one or more information elements defined in Table 4 below. In Table 4, an MCCH MBS CORESET may mean an MBS CORESET for MCCH transmission, an MCCH MBS PDSCH may mean an MBS PDSCH for MCCH transmission, an MCCH CORESET may mean a CORESET for MCCH transmission, and an MCCH PDSCH may mean a PDSCH for MCCH transmission.

TABLE 4

| Information elements |
|---|
| Identifier of a BWP including MCCH MO |
| Configuration information of PRB(s) (e.g., PRB reference point, offset parameter, etc.) for an MCCH MBS CORESET and/or MCCH MBS PDSCH in the frequency domain, in which MO is configured |
| Configuration information of PRB(s) (e.g., PRB reference point, offset parameter, etc.) for an MCCH CORESET and/or MCCH PDSCH in the frequency domain, in which MCCH MO is configured |
| Configuration information of PRB(s) (e.g., SPS configuration information, periodicity of MBS PDCCH (or CORESET), periodicity of MBS PDSCH, PRB reference point, offset parameter, etc.) for an MCCH MBS CORESET and/or MCCH MBS PDSCH in the time domain, in which MO is configured |
| Configuration information of PRB(s) (e.g., SPS configuration information, periodicity of MCCH PDCCH (or CORESET), periodicity of MCCH PDSCH, PRB reference point, offset parameter, etc.) for an MCCH CORESET and/or MCCH PDSCH in the time domain, in which MCCH MO is configured MCCH-RNTI configuration information |

The configuration information for on-demand MCCH reception may include at least one of an index of a random access (RA) preamble (e.g., 2-step RA preamble and/or 4-step RA preamble) for on-demand MCCH request, configuration information of an uplink reference signal (e.g., CSI-RS index and/or configuration information) for on-demand MCCH request, MCCH MO configuration for on-demand MCCH reception, or a combination thereof.

The MCCH-RNTI may mean a scheduling identifier configured only for MCCH transmission. The terminal may receive an MCCH in the MCCH MO, MO, or another downlink channel (e.g., PRB(s) of a downlink channel other than the MCCH MO or MO) by using the MCCH-RNTI. When the MCCH MO is not separately indicated (or configured), the MCCH may be transmitted in the MO or PRB(s) of a downlink channel (or, radio resource of the unicast BWP) capable of transmitting a unicast service packet other than the MO.

When the MBS configuration information is transmitted using system information (e.g., MBS system information), indication information notifying a change in the MBS system information or MBS SIB may be transmitted using a scheduling identifier (e.g., P-RNTI, SI-RNTI, or MI-RNTI) for system information change notification. Here, the indication information for notifying a change in the MBS system information or MBS SIB may be transmitted to the terminal through a PDCCH (or DCI) masked with the scheduling identifier for system information change notification or bitmap information within a PDCCH (or DCI) masked with a corresponding scheduling identifier (e.g., P-RNTI, SI-RNTI, or MBS change indication (MI)-RNTI). Similarly to a short message transmitted for system information change notification by using a P-RNTI, information of specific bit(s) of the bitmap may be used to indicate a change of the SIB including the MBS configuration information or a change of the MBS configuration information. For example, in order to indicate a change of the MBS SIB (e.g., SIB including the MBS configuration information) or a change of the MBS configuration information, a bit at a specific position in the bitmap may be set to 1.

The information notifying a change of the MCCH and/or a change of the MBS configuration information may be transmitted using the MCCH-RNTI, a scheduling identifier (e.g., MI-RNTI) for MBS configuration information change notification, or a scheduling identifier (e.g., C-RNTI, etc.) assigned to the terminal. In this case, the information notifying a change of the MCCH and/or a change of the MBS configuration information may be configured in form of a bitmap or a MAC control message (e.g., MAC CE, MAC PDU, MAC sub-PDU, MAC header, or MAC sub-header) within the PDCCH (or DCI). The base station may transmit the above-described bitmap or the above-described MAC control message to the terminal (or MBS terminal group). When the MAC control message including the information notifying a change of the MCCH and/or MBS configuration information is transmitted, an LCID for identifying the MAC control message notifying a change of the MCCH and/or MBS configuration information may be configured separately. and the LCID may be included in the MAC control message.

The terminal that is an MBS target may transmit feedback information (e.g., acknowledgement (ACK) or negative-ACK (NACK)) for a received MBS packet (e.g., downlink packet received using the MG-RNTI and/or MCCH-RNTI) on an uplink channel. A radio resource of the uplink channel (e.g., physical layer uplink control channel (e.g., PUCCH) configured for MBS feedback transmission) for transmitting the feedback information (hereinafter, referred to as 'MBS feedback') for the MBS packet may be configured to have a correspondence relationship (or mapping relationship) with a radio resource, the MG-RNTI (or MCCH-RNTI), and/or the MBS identifier (or MBS classifier) of a downlink channel on which the MBS packet is received.

When PRB(s) of the uplink channel on which the MBS feedback is transmitted (or PUCCH on which the MBS feedback is transmitted) has a corresponding relationship with the MG-RNTI or MBS identifier (or MBS classifier), the PRB(s) of the uplink channel on which the MBS feedback is transmitted may be configured to have a correspondence relationship with the MG-RNTI assigned to the terminal (or, MBS terminal group) or the identifier for identifying the MBS (e.g., service ID, session ID, TMGI, MBS bearer identifier, or MBS LCID).

When NACK indicating a failure to receive the MBS packet (e.g., downlink MBS packet) is received from the terminal (or, MBS terminal group), the base station may retransmit the MBS packet. The retransmitted MBS packet may be transmitted in the MO (or, downlink channel configured for MBS transmission) or unicast BWP. A position of PRB(s) for the MBS retransmission within the MO or unicast BWP may be configured to have a correspondence relationship with a position of PRB(s) for a downlink channel used for previous transmission by using a preset offset. Alternatively, the MBS packet retransmission may be configured to be performed after a preset timer (or time interval and/or offset) from a reception time of the MBS packet that has failed to be received in the terminal (or, MBS terminal group) or a transmission time of the MBS feedback. A PDCCH (or DCI) for transmitting scheduling information of the MBS packet retransmitted according to the above scheme may be transmitted using a scheduling identifier (e.g., UE-specific RNTI, C-RNTI, SPS-RNTI) assigned to the terminal. Alternatively, the PDCCH (or DCI) for transmitting the scheduling information of the retransmitted MBS packet may be transmitted using the MG-RNTI assigned to the terminal (or MBS terminal group).

Parameters (e.g., information elements) for the above-described MBS retransmission may be transmitted to the terminal using system information, MBS configuration information, and/or MCCH configuration information.

When the MBS is provided to the terminal in the PTP scheme, the PDCCH (or DCI) for MBS provision, MCCH configuration information, MBS configuration information, and/or MBS packet may be transmitted in the unicast scheme using a radio resource capable of transmitting unicast packets (or, PRB(s), radio resource of unicast BWP). In this case, the PDCCH (or DCI) for MBS provision may be transmitted using a scheduling identifier (or UE-specific RNTI, C-RNTI, SPS-RNTI) assigned to the terminal.

Figure 7:
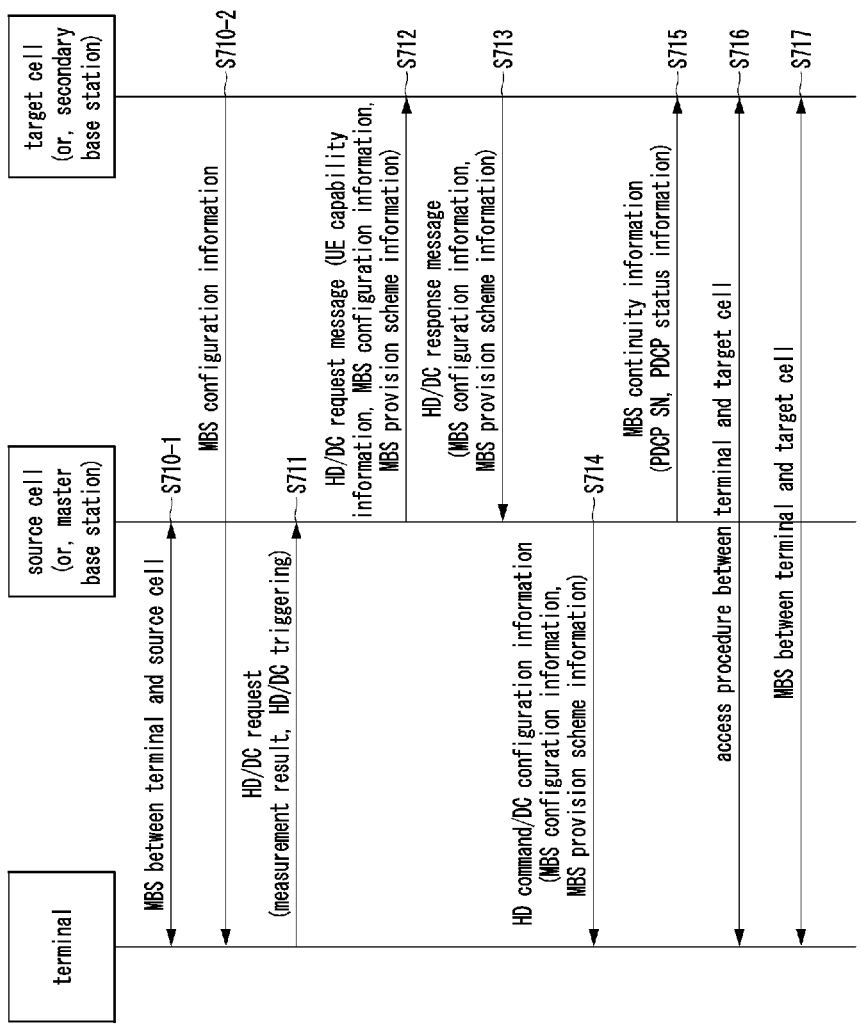
FIG. 7 is a sequence chart illustrating a first exemplary embodiment of a procedure between a terminal and a cell (or base station) for providing MBS continuity.

FIG. 7 is a sequence chart illustrating a first exemplary embodiment of a procedure between a terminal and a cell (or base station) for providing MBS continuity.

Referring to FIG. 7, a communication system may include a terminal, a source cell, and a target cell. The source cell may refer to a master base station or a serving cell. The target cell may mean a secondary base station. In an exemplary embodiment, the base station may mean a cell, an operation of the source cell may be interpreted as an operation of a source base station or a master base station, and an operation of the target cell may be interpreted as an operation of a target base station or a secondary base station.

The source cell may provide an MBS to the terminal (S710-1). That is, MBS communications between the terminal and the source cell may be performed in the step S710-1. The target cell may transmit MBS configuration information to the terminal (S710-2). The terminal may receive the MBS configuration information from the target cell. The step S710-2 may be selectively performed. If the terminal moves to another base station (or another cell) while the MBS is provided to the terminal, methods for maintaining MBS continuity are required. For MBS continuity, a terminal in the RRC connected state may support a handover (HO) function and/or a dual connectivity (DC) function. The base station may transmit, to a counterpart base station, a control message including information indicating whether each base station supports MBS provision, load state information of each base station, and the like. That is, the above-described control message may be exchanged between the base station and the counterpart base station.

The base station may change (or determine) the MBS provision scheme in consideration of information indicating whether or not to provide the MBS, load state information, and the like. For example, the base station may change the MBS provision scheme from the PTM scheme to the PTP scheme. Alternatively, the base station may change the MBS provision scheme from the PTP scheme to the PTM scheme. The PTM scheme may be the broadcast scheme or the multicast scheme. In addition, in a handover and/or dual connectivity support phase (or preparation phase), the source cell may deliver MBS-related PDCP status information and PDCP SN synchronization information of the terminal to the target cell. Hereinafter, in case that the terminal operates in the RRC inactive state or the RRC idle state, the target cell may mean a cell on which the corresponding terminal performing a mobility function (e.g., cell (re)selection operation) decides to camp.

The terminal may transmit a control message requesting support or configuration of the handover and/or dual connectivity function to the source cell (S711). The control message may be a handover request message or a dual connectivity request message. The control message may include a result of a measurement operation performed by the terminal and/or a HO/DC triggering indicator. In the step S711, the source cell may receive the control message from the terminal, and may identify information element(s) included in the control message. In this case, the source cell may generate a HO request message or a DC request message including UE capability information, MBS configuration information, and/or MBS provision scheme information of the terminal, and transmit the HO request message or the DC request message to the target cell (S712).

The MBS configuration information may be information configured to the terminal for broadcast MBS provision and/or multicast MBS provision. The HO/DC request message may include all or some information elements (e.g., some parameters) of the MBS configuration information. When the source cell recognizes whether the target cell supports MBS provision and/or load state information of the target cell according to the MBS provision before the step S711, the source cell may transmit the requested MBS provision scheme information to the target cell in the step S711. The requested MBS provision scheme information may mean information indicating a change request of the MBS provision scheme (e.g., change from the PTM scheme to the PTP scheme or change from the PTP scheme to the PTM scheme) or information on the requested MBS provision scheme (e.g., the PTM scheme or PTP scheme).

The target cell may receive the HO request message or DC request message (e.g., control message) from the source cell. In this case, the target cell may generate a HO response message or a DC response message (e.g., control message) including the MBS configuration information and/or MBS provision scheme information of the target cell for the terminal, and the transmit the HO response message or DC response message to the source cell (S713). The MBS provision scheme information may mean information indicating whether the terminal changes the MBS provision scheme (e.g., change from the PTM scheme to the PTP scheme or change from the PTP scheme to the PTM scheme) or information on the MBS provision scheme (e.g., PTM or PTP).

Before the step 712 and/or step 713, the cell (e.g., source cell or target cell) may transmit a control message including information indicating whether MBS is provided, load state information, and the like to a counterpart cell or neighbor cell. The above-described control message may be exchanged between the cell and the counterpart cell or the cell and the neighbor cell. Accordingly, the cell may change the MBS provision scheme of the terminal from PTM to PTP or from PTP to PTM in consideration of whether the MBS is provided, load state, and the like in the step 712 and/or the step 713.

The source cell may receive the HO response message or the DC response message from the target cell, and may identify the MBS configuration information and/or MBS provision scheme information of the target cell included in the HO response message or DC response message. In this case, the source cell may transmit the MBS configuration information and/or MBS provision scheme information to the terminal (S714). In the step S714, the HO command message or DC configuration information including the above-described information may be transmitted. The MBS provision scheme information may include information indicating a change from the PTM scheme to the PTP scheme, information indicating a change from the PTP scheme to the PTM scheme, and/or information an MBS provision scheme (e.g., PTM scheme or PTP scheme) used in MBS communications with the target cell. The MBS provision scheme information may be transmitted to the terminal by using a MAC layer control message and/or a physical layer control channel (e.g., PDCCH, DCI, etc.).

When the HO response message or DC response message is received from the target cell, the source cell may transmit, to the target cell, a control message including MBS continuity information (e.g., MBS-related PDCP status information, PDCP SN, synchronization information, etc.) for MBS continuity of the terminal (S715). In addition, in the step S715, the source cell may forward MBS packets to the target cell. In the step S714, the terminal may receive the HO command message or DC configuration information from the source cell. Each of the HO command message or DC configuration information may include the MBS configuration information and/or the MBS provision scheme information. Each of the HO command message or DC configuration information may be included in the control message (e.g., RRC reconfiguration message).

When the HO command message or DC configuration information is received, the terminal may perform an access procedure to the target cell (S716). In the step S716, the access procedure may be a random access procedure for radio access to the target cell, a physical layer synchronization configuration procedure for downlink and/or uplink (or physical layer synchronization acquisition procedure), or a procedure for configuring a TCI state ID for beam paring. When the step S716 is completed, the target cell may provide the MBS to the terminal (S716). That is, even when the terminal moves, MBS continuity may be maintained.

When the operation state (e.g., RRC state) and/or MBS provision scheme of the terminal is one of the following, if the terminal, which is an MBS target, moves to another cell (e.g., target cell), some of all the steps shown in FIG. 7 may be selectively performed. Even when the selected some steps are performed, MBS continuity may be provided.

When the operation state of the terminal is the RRC inactive state

When the operation state of the terminal is the RRC idle state

When the MBS is provided in the broadcast scheme and the operation state of the terminal is in the RRC connected state In the step S710-1, the terminal may obtain information indicating whether the target cell and/or neighbor cell supports MBS provision (hereinafter, 'MBS provision indication information') and/or MBS configuration information from the source cell through system information and/or an RRC layer control message. The MBS provision indication information may indicate that the target cell provides MBS or that the target cell does not provide MBS. Alternatively, in the step S710-2, the terminal may obtain the MBS provision indication information and/or the MBS configuration information through system information of the target cell and/or neighbor cell, MBS control message in the broadcast scheme, and/or MBS control message in the groupcast scheme. Here, the MBS control message in the broadcast scheme (or groupcast scheme) may mean a control message transmitted by the base station (or cell) to terminals within the cell in the broadcast scheme (or multicast scheme or groupcast scheme) by using a scheduling identifier (e.g., MG-RNTI, MCCH-RNTI, etc.). That is, the MG-RNTI and/or the MCCH-RNTI may be assigned to distinguish (or identify) the broadcast or multicast MBS. Accordingly, the terminal may distinguish (or identify) the broadcast or multicast MBS based on the assigned MG-RNTI and/or MCCH-RNTI.

Another method of distinguishing (or identifying) the MBS of the broadcast or multicast scheme is a method of configuring MBS CORESETs and/or MBS radio resources separately for the broadcast MBS or the multicast MBS. The base station may transmit the MBS configuration information and/or MCCH information through the broadcast scheme or groupcast scheme.

In the step S710-1 and/or step S710-2, the terminal may obtain the MBS provision indication information, MBS configuration information, and the like of the target cell and/or neighbor cell. In this case, the terminal may perform MBS communications with the target cell and/or the neighbor cell by performing only the step S716. In the step S716, the terminal may perform the MBS communications with the target cell and/or neighbor cells after performing the physical layer synchronization configuration procedure (or physical layer synchronization acquisition procedure) for downlink and/or uplink or a TCI state ID configuration procedure for beam pairing for the target cell and/or neighbor cell.

When the MBS of the PTM scheme is provided from the serving cell to the terminal in the RRC inactive state or the RRC idle state, the terminal may receive the MBS without performing the access operation to the target cell in the step 716. That is, if the target cell selected from neighbor cell(s) based on a result of cell (re)selection operations (or mobility function support operations) performed by the terminal in the RRC inactive state or the RRC idle state provides the PTM MBS, the terminal may be provided with the MBS in the step S716 without performing the access operation to the selected target cell.

In order to provide MBS continuity, the terminal may transmit preferred scheme information or switching request information to the source cell and/or the target cell. The preferred scheme information may be information indicating a preference for switching from the PTM scheme to the PTP scheme or information indicating a preference for switching from the PTP scheme to the PTM scheme. The switching request information may be information requesting switching from the PTM scheme to the PTP scheme or information requesting switching from the PTP scheme to the PTM scheme. Each of the preferred scheme information and the switching request information may be transmitted in the step S710-1, step S711, and/or step S716. In addition, when the MBS of the PTM scheme is provided from the serving cell to the terminal in the RRC inactive state or the RRC idle state, the terminal may perform an access procedure (e.g., step S716) for requesting PTP MBS to the target cell selected from neighbor cell(s) based on a result of cell (re)selection operations (or mobility function support operations).

When the MBS of the PTM scheme is provided to the terminal, the terminal may determine (or expect) that the MBS of the PTM scheme cannot be provided from the serving cell or the target cell, based on the MBS provision indication information, MBS configuration information, load state information, quality criteria of a radio channel for MBS provision, and/or handover condition (or, 'RRC reconfiguration with sync' in the NR system) configuration information, which are acquired from the respective cells. In this case, the terminal may transmit a control message including switching request information (e.g., information requesting switching from the PTM scheme to the PTP scheme) to the source cell or the target cell. Here, the control message may be uplink physical layer control information, an uplink MAC layer control message, or an RRC layer control message.

The uplink physical layer control information may be at least one of a PUCCH, uplink control signal, RA preamble index allocated to the terminal, random access occasion (RO) allocated for MBS provision, RA preamble index allocated for MBS provision, or identifier assigned for MBS provision scheme change. The uplink MAC layer control message transmitted by the terminal may be a MAC CE, MAC PDU, MAC sub-PDU, MAC header, or MAC sub-header. The RRC layer control message transmitted by the terminal may be an uplink RRC control message or a UE assistance information message including the preferred scheme information, switching request information, and/or MBS configuration information of the terminal.

The RRC layer control message may include at least one of a service identifier of an MBS preferred (or desired) by the terminal (or MBS terminal group), service area identifier (SAI) of an MBS, MBS BWP, information on an MO for MBS, identifier of an MBS terminal group for MBS, or radio bearer configuration information for MBS packet transmission. A terminal interested in MBS reception may transmit, to the base station, information for identifying the interested or desired MBS (e.g., MBS service identifier, MBS terminal group identifier for MBS, MBS session ID, MBS service area identifier, MBS radio bearer ID, MBS frequency, and/or MBS BWP identifier) by using an uplink RRC layer control message (e.g., UE assistance information message, uplink control message for connection release, uplink control message for state transition of the terminal, etc.).

When one or more conditions defined in Table 5 below are satisfied, the base station may transmit, to the terminal (or, MBS terminal group) to which the MBS is provided in the broadcast scheme or multicast scheme), information indicating a change of the MBS provision scheme (e.g., change from the PTM scheme to the PTP scheme). The information indicating the change of the MBS provision scheme may be transmitted in the step S710-1.

TABLE 5

Conditions

The base station receives, from the terminal, information indicating a request (or preference) of a change from the PTM scheme to the PTP scheme.
The serving base station determines a change of MBS provision scheme to be required basedon MBS provision situations of the serving base station and/or adjacent base station(s), without a request of MBS provision scheme change from the terminal.
The change of MBS provision scheme is required for MBS continuity provision.

When one or more conditions defined in Table 6 below are satisfied, the base station may transmit, to the terminal (or, MBS terminal group) to which the MBS is provided in the PTP scheme), information indicating a change of the MBS provision scheme (e.g., change from the PTP scheme to the PTM scheme). The information indicating the change of the MBS provision scheme may be transmitted in the step S710-1. The PTM scheme may be the broadcast scheme or the multicast scheme.

TABLE 6

Conditions

The base station receives, from the terminal, information indicating a request (or preference) of a change from the PTP scheme to the PTM scheme.
The serving base station determines a change of MBS provision scheme to be required based on MBS provision situations of the serving base station and/or adjacent base station(s), without a request of MBS provision schemechange from the terminal.
The change of MBS provision scheme is required for MBS continuity provision.

The base station may transmit control information indicating a change from the PTP scheme to the PTM scheme to the terminal (or, MBS terminal group) provided with the MBS in the PTP scheme. In this case, the base station may transmit change indication information of the MBS provision scheme (e.g., PTP scheme→PTM scheme) by using a downlink physical layer control channel, a downlink MAC layer control message, and/or an RRC layer control message. The change indication information of the MBS provision scheme may include at least one of the MBS terminal group to which the MBS is provided in the PTP scheme, a scheduling identifier for PTM transmission, MBS, MBS BWP, MBS CORESET, MO for MBS, identification information of MCCH MO, or MBS bearer configuration information for PTM transmission.

Upon receiving the change indication information of the MBS provision scheme (e.g., PTP scheme→PTM scheme), the terminal may perform MBS communications in the PTM scheme using the MBS configuration information received from the source cell or the target cell. Here, the MBS configuration information received from the source cell or the target cell may be included in a dedicated control message and/or system information. The terminal may receive the MBS configuration information and the change indication information of the MBS provision scheme together. Alternatively, the terminal may first receive the change indication information of the MBS provision scheme, and then obtain the MBS configuration information by receiving the system information or control message transmitted in the broadcast scheme and/or the multicast scheme from the source cell or the target cell.

The change indication information of the MBS provision scheme may be transmitted using a downlink physical layer control channel, a downlink MAC layer control message, and/or an RRC layer control message. Here, the downlink physical layer control channel may mean a PDCCH or DCI. Information of the identifier for identifying the MBS terminal group, MBS, MBS BWP, and/or RO for the MBS may be included in the DCI. The PDCCH masked with the MG-RNTI assigned for the MBS terminal group or MBS may include the change indication information of the MBS provision scheme. The downlink MAC layer control message may be a MAC CE, MAC PDU, MAC sub-PDU, MAC header, or MAC sub-header. The downlink MAC layer control message may include information indicating the change from the PTM scheme to the PTP scheme. The RRC layer control message may be an RRC reconfiguration message including the MBS configuration information for indicating the change of the MBS provision scheme. The RRC layer control message may include at least one of identification information for identifying the MBS terminal group (or scheduling identifier for PTM transmission), MBS, MBS BWP, MBS CORESET, MO for the MBS, or MCCH MO, or configuration information of an MBS bearer for PTM transmission.

When necessary, the base station may configure the PTP scheme and the PTM scheme together to the terminal, and may provide the MBS to the terminal based on the above-described configuration. In the PTP-based MBS, scheduling information and/or physical layer control information for the MBS may be transmitted using a PDCCH (or DCI) masked with a scheduling identifier uniquely assigned to one terminal (e.g., UE-specific RNTI). Here, the UE-specific RNTI may be a C-RNTI or an SPS-RNTI assigned to the terminal. Alternatively, the UE-specific RNTI may be a scheduling identifier for MBS provision, which is uniquely assigned to the terminal. Therefore, only a specific terminal may receive MBS packets on a downlink channel (e.g., PDSCH) addressed by the PDCCH (or DCI).

In the PTM-based MBS, scheduling information and/or physical layer control information for the MBS may be transmitted to one or more terminal (or, MBS terminal group) using a PDCCH (or DCI) masked with a scheduling identifier (e.g., group common RNTI) assigned to the one or more terminals (or, MBS terminal group). The group common RNTI may be a group common scheduling identifier assigned to the one or more terminals (or, MBS terminal group). For example, the group common RNTI may be an MG-RNTI, MBS-RNTI, G-RNTI, or GC-RNTI. Accordingly, the one or more terminals (or, MBS terminal group) may receive MBS packets on a downlink channel (e.g., PDSCH) addressed by the PDCCH (or DCI).

When the PTP scheme and the PTM scheme are configured together to one terminal for MBS provision, the terminal may perform a monitoring operation on PDCCHs (or DCI) using the UE-specific RNTI or the group common RNTI, and may receive MBS packets from the base station based on a result of the monitoring operation. The MBS packet may be an MBS packet transmitted only for the terminal or an MBS packet transmitted for the MBS terminal group. The base station may transmit information indicating that the next MBS transmission is to be performed in the PTP scheme, information indicating that the next MBS transmission is to be performed in the PTM scheme, and/or change indicating information of the MBS provision scheme by using field information of the PDCCH (or DCI)

scrambled with the UE-specific specific RNTI or group common RNTI and/or the MAC layer control message (e.g., message including a MAC CEL, MAC PDU, MAC sub-PDU, MAC header, and/or MAC sub-header).

The change indication information of the MBS provision scheme may be information indicating a change from the PTP scheme to the PTM scheme or information indicating a change from the PTM scheme to the PTP scheme. The change from the PTP scheme to the PTM scheme may be signaled to the terminal using activation indication information for the PTM scheme or deactivation indication information for the PTP scheme. The change from the PTM scheme to the PTP scheme may be signaled to the terminal using activation indication information for the PTP scheme or deactivation indication information for the PTM scheme. The field information of the PDCCH (or DCI) or an indicator or a value (e.g., 0 or 1) of a specific bit in the MAC layer control message may indicate activation or deactivation of each of the PTP scheme and the PTM scheme. In particular, in order to indicate activation (or deactivation) for the PTM scheme-based MBS, a group common RNTI indicating activation (or deactivation) may be used. For example, the base station may activate the PTM scheme-based MBS by transmitting a PDCCH (or DCI) masked with a group common RNTI indicating activation in the MO for MBS. Alternatively, the base station may deactivate the PTM scheme-based MBS by transmitting a PDCCH (or DCI) masked with a group common RNTI indicating deactivation in the MO for MBS.

The base station may transmit information on a change time (i.e., change time information) of the MBS provision scheme to the terminal by using the field information of the PDCCH (or DCI) scrambled with the UE-specific RNTI or group common RNTI and/or MAC layer control message. The terminal may estimate or calculate the change time of the MBS provision scheme based on the change time information received from the base station. Alternatively, the base station may transmit information on an end time (i.e., end time information) of MBS packet transmission based on the PTP scheme (or PTM scheme) to the terminal. The terminal may estimate or calculate the end time of MBS packet transmission based on the end time information received from the base station. Alternatively, the base station may transmit information on a start time of MBS packet transmission based on the PTP scheme (or PTM scheme) to the terminal. The terminal may estimate or calculate the start time of MBS packet transmission based on the start time information received from the base station.

When the PTP scheme and the PTM scheme are configured together to one terminal for MBS provision, initial transmission (or first transmission) of an MBS packet may be performed by the PTP scheme, and retransmission of the MBS packet may be performed by the PTM scheme. Therefore, when a NACK feedback is transmitted for the initial transmission according to the PTP scheme or when reception of the initial transmission according to the PTP scheme fails, the terminal may perform a monitoring operation on PDCCH(s) (or DCI) scrambled with the group common RNTI to receive the MBS packet retransmitted in the PTM scheme.

Alternatively, initial transmission of an MBS packet may be performed in the PTM scheme, and retransmission of the MBS packet may be performed in the PTP scheme. Therefore, when a NACK feedback is transmitted for the initial transmission according to the PTM scheme or when reception of the initial transmission according to the PTM scheme fails, the terminal may perform a monitoring operation on PDCCH(s) (or DCI) scrambled with the UE-specific RNTI to receive the MBS packet retransmitted in the PTP scheme.

When the PTP scheme and the PTM scheme are configured to one terminal for MBS provision, the terminal may transmit a HARQ response (e.g., feedback information (ACK or NACK)) for a downlink MBS packet received in the PTP scheme and/or PTM scheme by using an uplink radio resource allocated to (e.g., mapped) a downlink radio resource of the PTP scheme and/or PTM scheme. Here, the uplink radio resource for transmission of the HARQ response may be a radio resource of a physical layer uplink channel (e.g., PUSCH or PUCCH) or a physical layer uplink channel separately configured for MBS feedback transmission.

The terminal may transmit automatic repeat request (ARQ) status information for MBS provision to the base station by using a PTP type control message. The ARQ status information for MBS provision may include a sequence number (SN) of a successfully received data unit, an SN of a data unit that the terminal has failed to receive, and/or the last SN of consecutive data units that the terminal has successfully received. The PTP type control message may be a MAC layer control message, an RLC layer control message, or an RRC layer control message.

In the present disclosure, the radio channel quality may be a channel state indicator (CSI), a received signal strength indicator (RSSI), a reference signal received power (RSRP), a reference signal received quality (RSRQ), or a signal to interference and noise ratio (SINR). With respect to the operation of the timer defined or described in the present disclosure, although operations such as start, stop, reset, restart, or expire of the defined timer are not separately described, they mean or include the operations of the corresponding timer or a counter for the corresponding timer.

In the present disclosure, the base station (or cell) may refer to a node B (NodeB), an evolved NodeB, a base transceiver station (BTS), a radio base station, a radio transceiver, an access point, an access node, a road side unit (RSU), a radio remote head (RRH), a transmission point (TP), a transmission and reception point (TRP), or a gNB. In addition, the base station (or, cell) may a CU node or a DU node to which the functional split is applied.

In the present disclosure, the terminal may refer to a UE, a terminal, an access terminal, a mobile terminal, a station, a subscriber station, a mobile station, a portable subscriber station, a node, a device), an Internet of Thing (IoT) device, or a mounted apparatus (e.g., a mounted module/device/terminal or an on-board device/terminal).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
    receiving, from a base station, first configuration information of a unicast bandwidth part (BWP);
    receiving, from the base station, second configuration information of a multicast and broadcast service (MBS) resource region;
    receiving control information on an MBS physical downlink control channel (PDCCH) within the MBS resource region indicated by the second configuration information;
    receiving MBS data on an MBS physical downlink shared channel (PDSCH) within the MBS resource region, the MBS PDSCH being indicated by the control information; and
    receiving unicast data in the unicast BWP indicated by the first configuration information,
    wherein the MBS PDCCH is configured in an MBS control resource set (CORESET) within the MBS resource region, and a scheduling identifier for the control information is configured to be associated with the MBS CORESET.

2. The operation method according to claim 1, wherein the MBS resource region is an MBS BWP, a position in which the MBS BWP is configured varies depending on an operation state of the terminal, and the operation state is a radio resource control (RRC) connected state, RRC inactive state, or RRC idle state.

3. The operation method according to claim 2, wherein when the operation state is the RRC connected state and the unicast BWP is activated, the MBS BWP is configured within the unicast BWP.

4. The operation method according to claim 2, wherein when the operation state is the RRC inactive state or the RRC idle state, the MBS BWP is configured within an initial BWP or a default BWP.

5. The operation method according to claim 1, wherein the MBS resource region is configured in common for an MBS terminal group to which the terminal belongs.

6. The operation method according to claim 1, wherein the MBS resource region is an MBS BWP, and a frequency resource of the MBS BWP is configured to be associated with a frequency resource of the unicast BWP.

7. The operation method according to claim 1, wherein control information received within the unicast BWP includes a transmission configuration indicator (TCI) state ID of each of the MBS PDCCH and the MBS PDSCH.

8. The operation method according to claim 1, wherein the second configuration information includes frequency domain resource allocation information of the MBS resource region, and the frequency domain resource allocation information includes at least one of information on a start point, information on a reference point, information on an offset, information on a number of physical resource blocks (PRBs), or a combination thereof.

9. The operation method according to claim 8, wherein the start point is a frequency resource from which the MBS resource region starts in a frequency domain, and the start point is indicated by the reference point and the offset.

10. The operation method according to claim 8, wherein the reference point is a point A, a start PRB of the unicast BWP, a start PRB of the default BWP, a start BWP of the initial BWP, a start PRB of the MBS CORESET within the MBS resource region, or an end PRB of the MBS CORESET.

11. The operation method according to claim 1, wherein the second configuration information includes time domain resource allocation information of the MBS resource region, and the time domain resource allocation information includes at least one of information of a periodicity, information on a start point, information on an end point, information on an offset, information on a length, or a combination thereof.

12. An operation method of a terminal in a communication system, the operation method comprising:
    receiving, from a base station, first configuration information of a unicast bandwidth part (BWP);
    receiving, from the base station, second configuration information of a multicast and broadcast service (MBS) resource region;
    receiving control information on an MBS physical downlink control channel (PDCCH) within the MBS resource region indicated by the second configuration information;
    receiving MBS data on an MBS physical downlink shared channel (PDSCH) within the MBS resource region, the MBS PDSCH being indicated by the control information; and
    receiving unicast data in the unicast BWP indicated by the first configuration information,
    wherein a reception interval between the unicast data and the MBS data is greater than or equal to a BWP switching time, and the BWP switching time is set by the base station.

* * * * *